United States Patent [19]

Clarke et al.

[11] 3,765,835
[45] Oct. 16, 1973

[54] ANIONIC DISPERSION OF A SALT OF A CATIONIC DYE AND A SELECTED ARYLSULFONATE

[75] Inventors: Ray Allen Clarke, Pitman, N.J.; Erik Kissa, Wilmington, Del.; Harvey I. Stryker, Carney's Point, N.J.

[73] Assignee: E. I. du Pont de Nemours and Company, Wilmington, Del.

[22] Filed: Apr. 25, 1968

[21] Appl. No.: 724,238

[52] U.S. Cl.............................. 8/41 A, 8/89, 8/173, 8/168, 8/21 D, 8/21 C, 8/17, 8/41 B, 8/41 C, 8/172
[51] Int. Cl............................................. D06p 3/18
[58] Field of Search................... 8/89, 1.214, 172, 8/173, 21, 177, 178, 179; 106/22, 27, 308 N, 308 S

[56] References Cited
UNITED STATES PATENTS

| | | | |
|---|---|---|---|
| 1,613,228 | 1/1927 | Hoz et al. | 8/172 X |
| 2,768,054 | 10/1956 | Armento | 8/173 X |
| 2,848,296 | 10/1958 | Heller | 8/173 |
| 2,922,690 | 1/1960 | Mueller et al. | 8/21 |
| 3,288,551 | 11/1966 | Roff | 8/172 X |
| 3,185,538 | 5/1965 | Voltz et al. | 8/173 |
| 3,325,242 | 6/1967 | Bosshard | 8/62 X |
| 3,330,617 | 7/1967 | Lewis | 8/168 |

*Primary Examiner*—Donald Levy
*Attorney*—Gary A. Samuels

[57] ABSTRACT

An aqueous dispersion of (1) a water-insoluble salt of a cationic dye and a selected anion of an arylsulfonic acid with (2) an anionic dispersing agent selected from lignin sulfonate or a salt of a sulfonated naphthalene-formaldehyde condensate.

The salts can be represented by the formulas $D^+Ar'SO_3^-$ and $K^+ArSO_3^-$ where $D^+$ is a cationic dye having a resonating or delocalized positive charge and $Ar'$ is an aryl group substituted with substituents such that the summation of the pKa increments for the substituents is equal to or less than −0.9; and $K^+$ is a cationic dye having a localized positive charge and $Ar$ is an aryl group substituted with substituents such that the summation of the pKa increments for the substituents is equal to or less than −0.6.

The aqueous paste dispersions of the salts can be employed to dye acid-modified polyamide, polyester, or acrylic fibers, either alone or in a blend, by a number of dyeing techniques, including Thermosol, Pad Steam, Pad Roll or Exhaust Dyeing.

12 Claims, No Drawings

ANIONIC DISPERSION OF A SALT OF A CATIONIC DYE AND A SELECTED ARYLSULFONATE

BACKGROUND OF THE INVENTION

1. Field of the Invention

This invention is directed to novel dyeing compositions useful in the dyeing and printing of acid-modified acrylic, polyamide, and polyester fibers.

2. Description of the Prior Art

Acid-modified acrylic fibers, such as those described in U.S. Pat. Nos. 2,837,500 and 2,837,501, and acid-modified polyesters, such as those described in U.S. Pat. No. 3,018,272, have become widely used in textile applications and methods for continuously dyeing them have been sought. Early dyeing compositions employed to dye these fibers were conventional basic dyes in the form of their water-soluble salts. These early compositions, when used in the most common continuous dyeing methods, i.e., pad steam or Thermosol, exhibited low fixation, poor build-up, and low solubility limited shades obtainable to light-to-medium depths.

In addition, the concurrent growing use of fiber blends, e.g., a fiber blend of acid-modified polyacrylonitrile or polyester and a cellulosic polymer or a natural fiber such as wool, prompted additional need for new dyeing compositions. To dye the different types of fibers of the blend in the same dye bath presented complex problems which made necessary a careful consideration of the time of addition of the different types of dyes needed to dye each of the different types of fibers present, and a careful consideration of the compatability of the different types of dyes. Frequently, an anionic dye used to dye cotton or wool was found to co-precipitate with the basic cationic dye used to dye the acid-modified synthetic polymer. For the same reason, the economical and effective anionic thickeners and anionic dispersants did not give good results when employed with the basic cationic dyes in dyeing acid-modified polymer blends. Limited success for obtaining compatibility of cationic dyes with anionic agents has been achieved for pad bath operations, but requires the presence of a non-ionic surfactant.

Partial alleviation of the compatibility problems associated with the use of cationic dyes with anionic thickeners or dispersants was effected by employing a dyeing or printing composition of the water-insoluble complex formed from a basic cationic dye and a heteropoly acid in admixture with a dispersant formed by the sodium salt of the condensation product of formaldehyde and 2-naphthalene sulfonic acid. Such compositions are described in Canadian Pat. Nos. 737,934, 737,960 and 775,458. However, these compositions, although improving the compatability properties are not entirely satisfactory because (1) they do not build up well on the fiber with increasing dye concentration, (2) not all dye on tone with respect to the parent cationic dye color because duplication of shade is difficult, and (3) they are not applicable to fibers by a continuous Thermosol procedure.

Thus, the objects of this invention are to provide dye compositions which give good build-up on fibers with increasing concentration which are stable over prolonged periods of time, give level dyeings while maintaining shade, and which are applicable by a continuous Thermosol process. In addition, other objects of this invention are to provide dye compositions which are compatible with other dye bath ingredients such as anionic dyes, acid dyes, anionic thickeners, pad liquors, etc.; which are applicable to high temperature, continuous application without pretreatment of the fiber substrate, which are applicable to fiber substrates by pad steam, pad roll, printing or exhaust dyeing techniques; which yield a negligible stain on cotton, nylon or unmodified polyesters; and which are stable over a wide pH range, e.g., 2 to 10.

These and other objects which will become apparent hereinafter are accomplished by the compositions of this invention.

SUMMARY OF THE INVENTION

The compositions of this invention comprise an aqueous dispersion of 1. a water-insoluble salt of a cationic dye and a selected anion of an arylsulfonic acid, and
2. an anionic dispersing agent selected from lignin sulfonate or a salt of a sulfonated naphthalene-formaldehyde condensate.

The cationic dye component of the salt is selected from (a) cationic, basic dyes having a delocalized, or resonating, positive charge, and (b) cationic dyes having a localized, i.e., pendant, positive charge represented by the formula

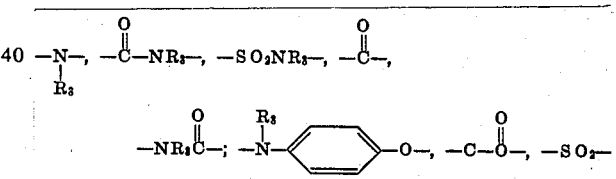

wherein Z is a dye nucleus;

Y is a connecting linkage selected from a covalent bond, alkylene of one to six carbon atoms,

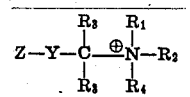

and the like;

$R_1$ and $R_2$, taken separately, are each selected from lower alkyl, lower cyanoalkyl, lower hydroxyalkyl and aralkyl of 7 to 11 carbon atoms; and joined together, is a divalent alkylene group which forms a heterocyclic ring with the $N^\oplus$ nitrogen;

$R_3$ is hydrogen or lower alkyl; and $R_4$ is lower alkyl or $NH_2$.

The definition of the selected anion of an aryl sulfonic acid is dependent upon the cationic dye present. When the cationic dye is the cationic basic dye having a delocalized positive charge, the aryl sulfonic anion is represented by the formula

in which Ar' is a carbocyclic aromatic moiety containing 6 to 14 ring carbon atoms, with the provisos that Ar' is devoid of water-solubilizing or ionogenic substituents, and that Ar' is substituted with substituent groups such that the summation of the pKa increments for the substituents, as measured on benzoic acid derivatives in aqueous medium, is equal to or less than −0.9.

When the cationic dye is one having a localized, pendant positive charge, the arylsulfonic anion is represented by the formula $$ArSO_3^{\ominus}$$

wherein Ar is defined the same as Ar' except that the summation of the pKa increments is equal to or less than −0.6.

Thus, the water-insoluble salt of a cationic dye and a selected anion of an aryl sulfonic acid can be represented by the following two formulas:

$$D^{\oplus} \; Ar'SO_3^{\ominus} \; \text{and} \; K^{\oplus} \; ArSO_3^{\ominus}$$

wherein $D^{\oplus}$ represents a cationic, basic dye having a resonating or delocalized positive charge; Ar' and Ar are as defined above; and $K^{\oplus}$ represents a cationic dye having a localized, pendant positive charge represented by the formula

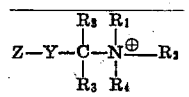

wherein Z, Y, $R_1$, $R_2$, $R_3$ and $R_4$ are as defined previously.

DETAILED DESCRIPTION OF THE INVENTION

A. THE SALT OF THE DELOCALIZED POSITIVE CHARGED DYE AND THE ANION $Ar'SO_3^{\ominus}$

1. The Cation $D^{\oplus}$

The cationic, i.e., basic, dyes with a delocalized, resonating, positive charge that are operable in the salt component of the compositions of this invention encompass a wide variety of dyes distinguished by the fact that their positive charge is not localized on a single atom, but rather is delocalized through resonance between various atoms of the dye structure. Resonance is a term describing a well-known phenomenon of chemistry. See, for example, "Mechanism and Structure in Organic Chemistry," by E.S.Gould; Henry Holt and Co., New York, 1959, and "The Chemistry of Synthetic Dyes," Vol. I, Chapter V, by K. Venkataraman, Academic Press, Inc., New York, 1952. According to the resonance theory, when a compound can have two or more structures that are equivalent or nearly so and that are interconvertible by the redistribution of electrons or ionized centers, the actual molecule does not conform to any one of the structures but exists as a resonance hybrid of them all. That is, all the canonical forms possible contribute to the true structure (the resonance hybrid). Thus the triarylmethane dye, Rosaniline, is a resonance hybrid composed of several major cononical forms shown as follows:

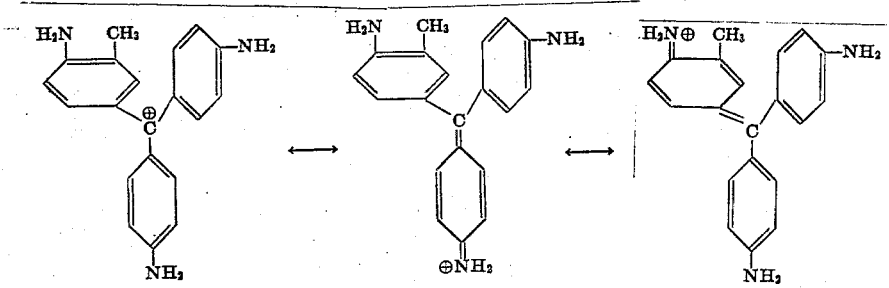

The various canonical forms shown above illustrate that the positive charge of the cation is not associated with any one atom, but is delocalized over many atoms of the molecule.

This principle of resonance stabilization by delocalization of the positive charge constitutes the essential criteria for defining the delocalized positive charge cation employed in the compositions of this invention. In other words, any cationic, basic dye having adjacent atoms containing either an unshared pair of electrons or a pair of electrons available for delocalization as the pi ($\pi$) electrons which form multiple or aromatic bonds is covered by this definition.

The following dye structures are illustrative of the cationic dyes having a delocalized positive charge effective for use in the compositions of this invention:

1. 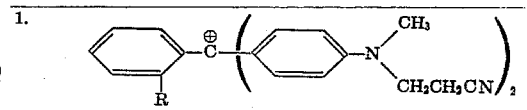

This dye, where R is Cl, is described in U.S. Pat. No. 3,021,344. 2. The formula 1 dye wherein R is H is described in U.S. Pat. No. 2,083,888.

3. 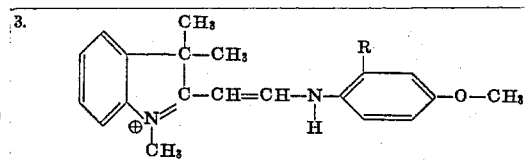

This dye, wherein R is H, is described in U.S. Pat. No. 2,155,459. 4. The dye of formula 3 where R is -$OCH_3$.

5. 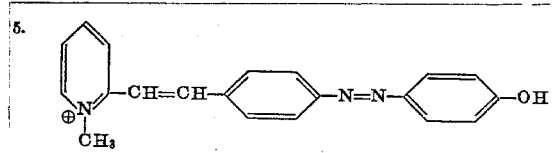

This dye is described in U.S. Pat. No. 3,192,195.

6.                                         C.I. 48,035
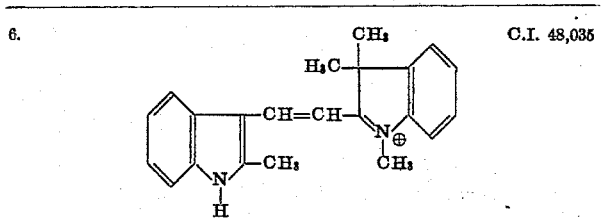

7. 

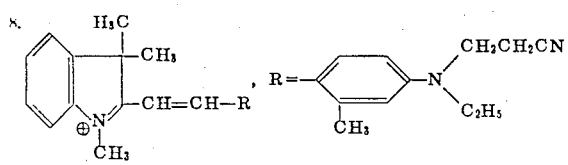

This dye is disclosed in U.S. Pat. No. 2,164,793 and U.S. Pat. No. 2,734,901. 9. The dye of formula 8 wherein R is

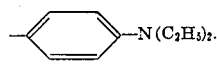

The dye is disclosed in U.S. Pat. Nos. 2,164,793 and 2,734,901. 10. The dye of formula 8 wherein R is

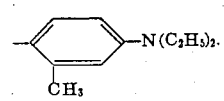

The dye is disclosed in the patents discussed under 8.

11. 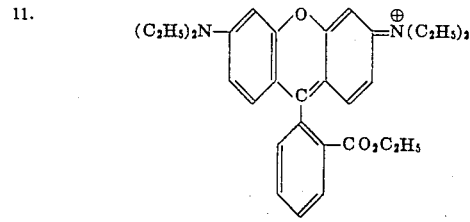

The corresponding methyl ester is C.I. 45,175.

12. 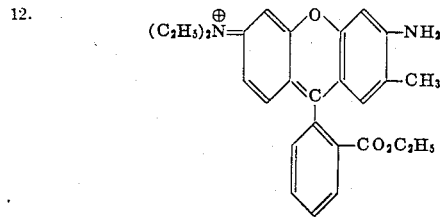

C.I. 45,215

13. The dye of formula 8 wherein R is

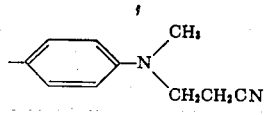

14. The dye of formula 8 wherein R is

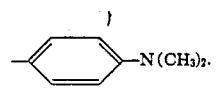

The dye is disclosed in U.S. patents discussed in No. 8.

15. 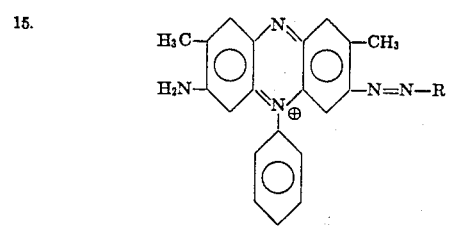

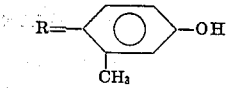

The dye is disclosed in U.S. Pat. No. 3,068,056.

16. The dye of formula 15 wherein R is

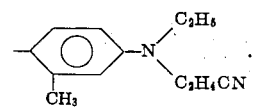

The dye is disclosed in U.S. Pat. No. 3,121,711.

17. 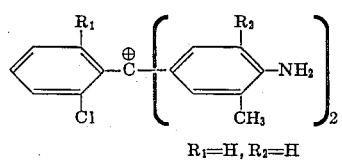

$R_1 = H, R_2 = H$

The dye is disclosed in U.S.Ser.No. 579,188, filed Sept. 14, 1966.

18. The dye of formula 17 wherein $R_1$ is Cl and $R_2$ is $CH_3$.

The dye is disclosed in U.S.Ser.No. 579,188.

19. 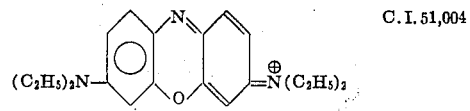 C.I. 51,004

20. 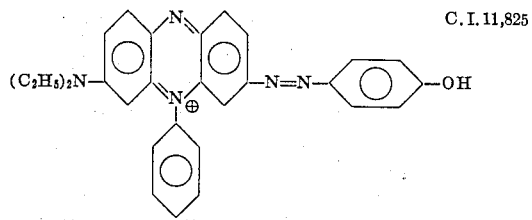 C.I. 11,825

21. The dye of formula 8 wherein R is

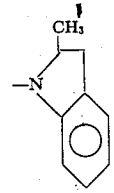

The dye is disclosed in U.S. Pat. No. 2,077,063.

22. 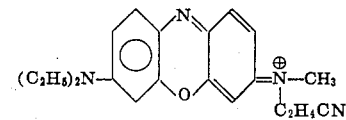

The dye is disclosed in U.S. Pat. No. 2,741,605.

23. The dye of formula 8 wherein R is

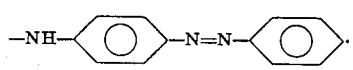

24. The dye of formula 8 wherein R is

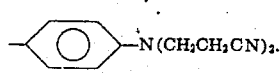

The dye is disclosed in Japanese Pat. No. 13,748/66

25. 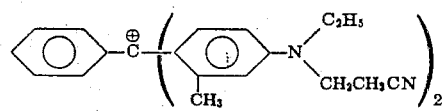

26. The dye of formula 8 wherein R is

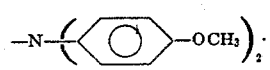

27. The dye of formula 8 wherein R is

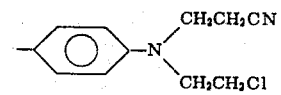

28. 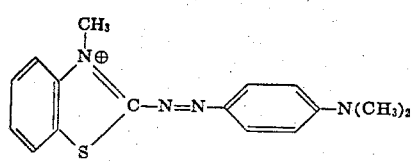

The dye is disclosed in U.S. Pat. No. 2,893,816.

29. 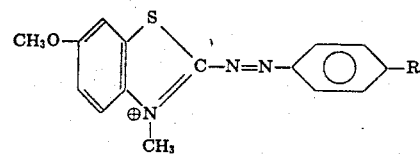

wherein R is

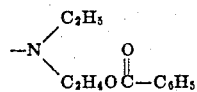

30. The dye of formula 29 wherein R is

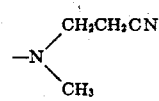

31. 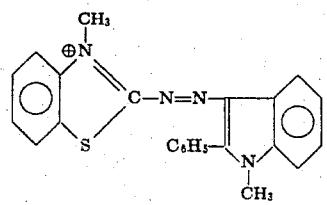

The dye is disclosed in U.S. Pat. No. 2,893,816.

32. 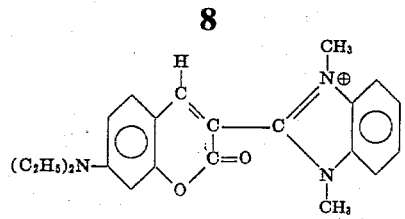

The dye is disclosed in U.S. Pat. No. 3,014,041.

33. 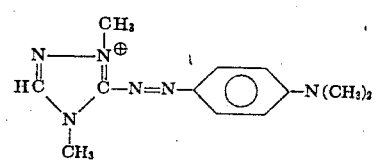

34. 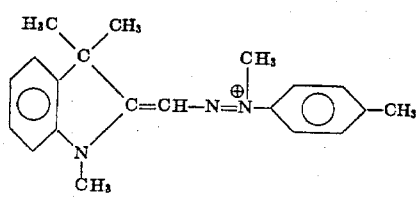

The dye is related to the dyes disclosed in U.S. Pat. No. 3,345,355.

35. 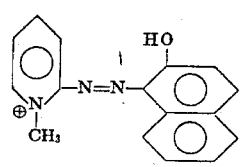

The dye is disclosed in U.S. Pat. No. 3,312,681.

36. 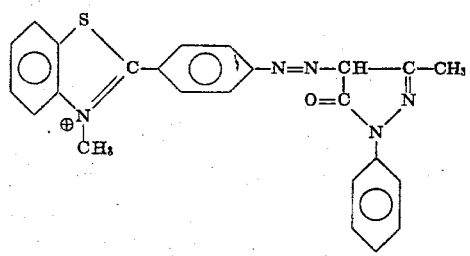

The dye is disclosed in U.S. Pat. No. 1,833,839.

37. 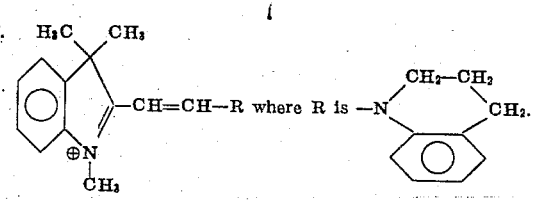

The dye is disclosed in U.S. Pat. No. 2,077,063.

38. The dye of formula 37 wherein R is

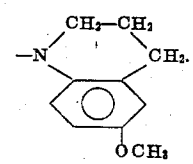

39. The dye of formula 37 wherein R is

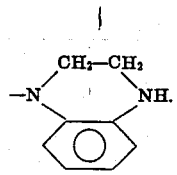

40. The dye of formula 37 wherein R is

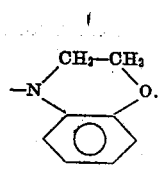

Thus representative basic dye classes which are suitable for reaction with arylsulfonic acids to form the water-insoluble (at room temperature) salts employed in the present invention include the following: diphenylmethanes (ketone imines) such as auramine; triarylmethane dyes such as C.I. Basic Green 1, C.I. 42,040, fuchsine (C.I. 42,500), resorcine violet (C.I. 43,520), victoria blue (C.I. 44,040), basic violet (C.I. 42,577)(Suppl.), rhoduline violet(C.I.44,520), the basic dyes of U.S. Pat. No. 3,021,344 (1962) to D.R.Baer; of U.S.Pat. No. 3,032,561(1962)to J.Pikl; of U.S. Pat. No. 2,083,888 (1937) to Carl Winter et al.; xanthene dyes such as Pyronine G (C.I. 45,005), methylene red (C.I. 45,006), Rhodamine S (C.I. 45,050), saccharein (C.I. 45,070), Rhodamine 5G (C.I. 45,105), Rhodamine G (C.I. 45,150), Rhodamine 6G (C.I. 45,160), Rhodamine 12GM (C.I. 45,310); acridines such as Acridine Orange NO (C.I. 46,005), Diamond Phosphine GG (C.I. 46,035), Rheonine AL (C.I. 46,075); methine dyes such as basic red C.I. 48,015, basic red C.I. 48,013, basic violet C.I. 48,020, basic orange C.I. 48,035, basic yellow C.I. 48,055, basic red C.I. 48,070, basic yellow C.I. 48,060, basic yellow C.I. 48,065, basic dyes prepared from 2-methylene-1,3,3-trimethylindoline (Fischer's Base) as disclosed in U.S. Pat. No. 2,734,901 and in "Synthetic Dyes" by Venkataraman, Academic Press Inc., New York, 1952, vol. II, page 1174, basic methine dyes as described in U.S. Pat. Nos. 2,155,459 and 2,164,793, basic azatrimethinecyanine dyes such as those disclosed by J. Voltz in "Angew. Chem." (English edition) pages 532-537, October 1962; thiazole dyes such as Thioflavine T (C.I. 49,005); indamine basic dyes such as basic green C.I. 49,405; azine dyes such as Mauve (C.I. 50,245), Safranine T (C.I. 50,240), basic violet C.I. 50,055, basic blue C.I. 50,306, Induline 6B Base (C.I. 50,400); oxazine dyes such as basic blue C.I. 51,004, Mendola's Blue C.I. 51,175, basic black C.I. 51,215; thiazine dyes such as Methylene Blue C.I. 52,015, basic green C.I. 52,020; and azo dyes having a delocalized positive charge such as the azo-safranine dyes described in U.S. Pat. No. 3,068,056 and U.S. Pat. No. 3,121,711, chrysoidine C.I. 11,270, basic brown C.I. 21,010, and basic dyes of British Pat. No. 896,681; U.S. Pat. Nos. 2,864,812, 2,864,813, 2,883,373, and 2,889,315; 2,906,747, and German Pat. No. 1,088,631.

The preceding list of dyes represents preferred classes of dyes and is not to be construed as being restrictive. The list is intended to exemplify the wide variety of chromophores applicable in this invention. The disclosures of the references cited in the preceding paragraph which pertain to the dye structure and preparation is incorporated herein.

2. The Anion Ar'SO$_3^\ominus$

The cationic dyes discussed in Part A(1) immediately above are most commonly taught in the patent literature as possessing adequate water solubility. Water solubility is achieved by preparing the dye as salts with anions usually selected from the following list: $Cl^\ominus$ , $Br^\ominus$ , $HSO_4^\ominus$ , $H_2PO_4^\ominus$ , $1/2SO_4^\ominus$, $ZnCl_3^\ominus$ , $CH_3SO_3^\ominus$ , $C_4H_9-SO_3^\ominus$ , $CH_3-O-SO_3^\ominus$ , $C_2H_5-O-SO_3^\ominus$ $C_6H_5-SO_3^\ominus$ , $CH_3-C_6H_4SO_3^\ominus$ (ortho or para), $HCOO^\ominus$ , $CH_3-COO^\ominus$ , $C_2H_5-COO^\ominus$ , $C_3H_7-COO^\ominus$ , $Cl-2-COO^\ominus$ , $C_6H_5-COO^\ominus$ , the lactate, oxalate, tartrate or citrate ion. When produced with these ions, the dyestuffs are sufficiently soluble in water to be applicable to polyacrylonitrile fibers from aqueous solution.

In the present invention, selected substituted carbocyclic arylsulfonates, Ar'SO$_3^\ominus$ , are employed in place of the water-solubilizing anions described above. These selected arylsulfonates provide tight salts with the cationic dye which are water-insoluble at room temperature, may be dispersed with selected anionic dispersing agents, are compatible (i.e.,do not co-precipitate by ion exchange) with acid dyes, anionic thickeners, and like ingredients of dye baths, and which fulfill the objectives of this invention as stated previously. In particular, they may be applied by a continuous Thermosol technique to acid-modified polyacrylonitrile and polyesters.

The substituents permissible on the carbocyclic arylsulfonate may vary widely. It has been found that permissible substituents on the arylsulfonates are those whose combined effect increases the acidity of the corresponding benzoic acids to a certain degree. More specifically, it has been found that any substituents which increase the acidity of benzoic acids, in an aqueous medium by at least 0.9 of a pKa unit, when added together, are useful substituents for the carbocyclic aromatic sulfonic acids used as complexing anions with the delocalized charge cations in this invention. Thus, on pages 592-593 of the "Determination of Organic Structures by Physical Methods," Vol. I, by Braude and Nachod, published by Academic Press, Inc., New York, 1955, is a table listing pKa increments for various substituents. Any of the listed substituents may be employed so long as their pKa sum has a value of −0.9 or less. As readily seen from inspecting pages 592-593, this requirement is readily fulfilled by two preferred complexing anions, as follows:

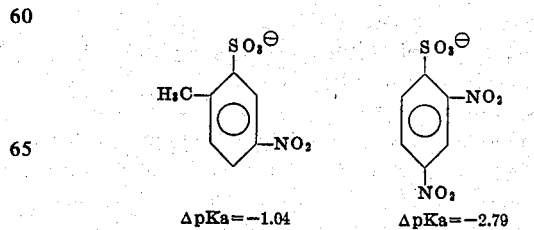

$\Delta pKa = -1.04$ $\Delta pKa = -2.79$

In addition, the following monosubstituted benzenesulfonic acids may be employed as complexing anions useful in attaining the objectives of this invention

| | Δ pKa |
|---|---|
| o-nitrobenzenesulfonate | −2.03 |
| o-iodobenzenesulfonate | −1.34 |
| o-bromobenzenesulfonate | −1.35 |
| o-chlorobenzenesulfonate | −1.26 |
| o-fluorobenzenesulfonate | −0.93 |

The list for operable polysubstituted carbocyclic aromatic sulfonates becomes much larger since the effects appear to be additive, as previously illustrated with the two preferred complexing agents. For example, the following complexing anions may be specifically mentioned as applicable:

| | ΔpKa |
|---|---|
| 3-methylsulfonyl-5-chlorobenzenesulfonate | −0.93 |
| 3-trifluoromethyl-5-cyanobenzenesulfonate | −1.01 |
| 2-ethyl-4-methylsulfonylbenzenesulfonate | −1.11 |
| 2,4-, 2,5-dichlorobenzenesulfonate | −1.47, −1.63 |
| 2-phenoxy-5-chlorobenzenesulfonate | −1.04 |

Other polysubstituted benzenesulfonic acids, useful in this invention are also suggested by the data on pages 594–595 of the Braude reference. On these two pages, pKa values, are listed as compared to the reference, benzoic acid itself. Since a lower pKa than benzoic acid, 4.20, indicates a stronger acid than benzoic, a simple subtraction of the listed values from 4.20 gives the ΔpKa. Thus, based on pages 594–595, the following benzene-sulfonates are also applicable in this invention. Many of these pKa values are somewhat surprising based on the values given for the monosubstituted benzoic acids shown on page 592–593. These apparent anomalies are usually rationalized on the basis of steric effects, as well as their electrical, i.e., inductive and resonance effects.

| | ΔpKa |
|---|---|
| 2,6-dimethylbenzenesulfonate | −0.99 |
| 2,4-dibromobenzenesulfonate | −1.50 |
| 2,5-dinitrobenzenesulfonate | −2.58 |
| 3,4-dinitrobenzenesulfonate | −1.38 |
| 2-nitro-4,5-dimethoxybenzenesulfonate | −1.71 |
| 2,3-dinitro-5,6-dimethoxybenzenesulfonate | −2.84 |

Additional substituted compounds are effective in this invention. Several are listed below with reference to their Hammett sigma constants. The pKa limitation is not altered here since the Hammett sigma constants can be derived from the degree of dissociation, i.e., ionization or pKa of substituted benzoic acids in an aqueous medium. A convenient list of Hammett sigma constants is available on p.87 in "Physical Organic Chemistry," 2nd Edition, by J. Hine, McGraw-Hill Book Co., Inc., 1962. Using Hammett sigma constants, the requirement is that sigma be equal to or greater than +0.9. This requirement is the equivalent of the requirement that the sum of the pKa's be equal to or less than <0.9. Thus, the following compounds may be employed:

| | Hammett Sigma Value |
|---|---|
| 3-cyano-4-acetobenzenesulfonate | +1.06 |
| 3-carboethoxy-4-cyanobenzenesulfonate | +1.03 |
| 3-acetamido-4-methylsulfonylbenzenesulfonate | +0.93 |
| 3,5-disulfonamidobenzenesulfonate | +0.92 |
| 3-acetoxy-4-sulfamylbenzenesulfonate | +0.96 |
| 3-methylsulfoxy-4-benzoylbenzenesulfonate | +0.98 |
| 3-nitro-4-p-nitrophenylbenzenesulfonate | +0.97 |
| 3-methylthio-4-nitrobenzenesulfonate | +0.94 |
| 3-phenoxy-4-cyanobenzenesulfonate | +0.91 |

Finally, several compounds are readily applicable as anions in this invention, for which ionization data is not conveniently found in the literature. Thus, in changing from benzene to naphthalene sulfonates, more than just the ionization constant must be considered to describe the effect on the solubilitiy of the cationic dye salts. For example, although the pKa values of benzoic acid and β-naphthoic acid are similar (3.20 and 3.16, respectively), the latter is 30 times less soluble. It is readily seen, however, since β-naphthoic aicd is more insoluble thann benzoic acid that the limitation that the pKa of the substituents be equal to or less than −0.9 applies equally to these latter compounds. Some such compounds include 5-, and 8-acetamido-2-naphthalenesulfonate
1-, and 2-anthraquinonesulfonate
2-chloro-3,5-dinitrobenzenesulfonate
2-chloro-5-nitrobenzenesulfonate
4-chloro-3-nitrobenzenesulfonate
8-cyano-1-naphthalenesulfonate
1-, and 2-naphthalenesulfonate
5-, and 8-nitro-1-naphthalenesulfonate
5, and 8-nitro-2-naphthalenesulfonate
2,6-dimethyl-8-, and -3-naphthalenesulfonate and
Acenaphthene-3-sulfonate It has been found that dyes illustrated by formula 3 will form water-insoluble, dispersable salts with a weaker sulfonate than generally applicable, for example, m-nitrobenzenesulfonate; and that to obtain water-insoluble crystalline precipitates, necessary for preparing good dispersions, with dyes represented by formulas 19 and 22, very strongly acidic sulfonates are more desirable, for example, 2,4-dinitrobenzenesulfonate. These conditions are preferred ones for use with the specified dyes.

B. THE SALT OF THE LOCALIZED, PENDANT POSITIVE CHARGE DYE AND THE ANION $ArSO_3^\ominus$ 1. The Cation $K^\oplus$ The cationic dyes having a pendant, localized positive charge which are useful in the salt with $ArSO_4^-$ have been previously defined as having the structure

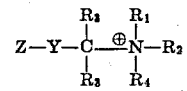

Preferably Z is an azo or anthraquinone-type dye chromo-phore. The positive charge is always carried by a quaternized nitrogen atom, which is added as an appendage to the dye chromophore. The appendage is present to insulate, i.e., localize, the positive charge from the highly unsaturated dye chromophore. This insulation can be effected by the presence of at least one alkylene group between the positively charged atom and the dye chromophore. The saturated insulating group thereby prevents any resonance interaction, i.e., delocalization, of the pi electrons of the chromophore with the positively charged center. Thus, since an insulating, alkylene group is present, this type of cationic dye is commonly described as a pendant basic dye.

The following structures are illustrative of the cationic, $K^\oplus$, dyes effective in the salt component of this invention:

41. 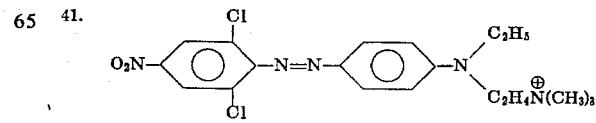

Disclosed in U.S. Pat. No. 2,099,525.

42. 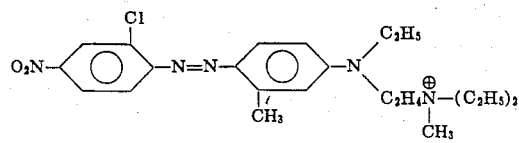

Related to dyes disclosed in U.S. Pat. No. 2,972,508.

43. 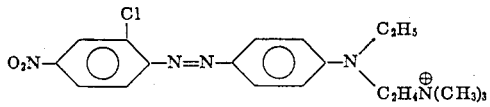

Related to dyes disclosed in U.S. Pat. No. 2,972,508.

44. 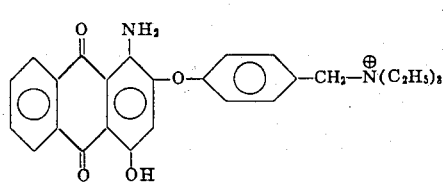

Disclosed in U.S. Pat. No. 2,888,467.

45. 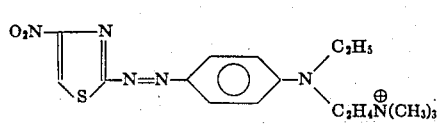

Disclosed in U.S. Pat. No. 2,972,508. Quaternary dyes of U.S. 3,023,212 as

46. 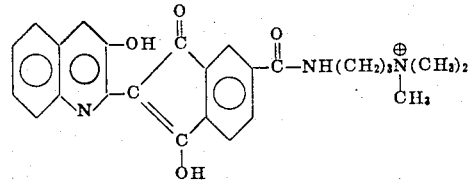

Disclosed in U.S. Pat. No. 3,023,212 and U.S. Pat. No. 2,834,793. Preferably obtained as the HCl salt.

47. 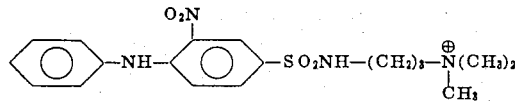

Disclosed in U.S. Pat. No. 2,834,793 as the HCl salts.

48. 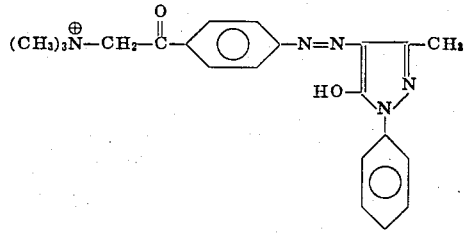

Disclosed in U.S. Pat. No. 3,119,810.

49. 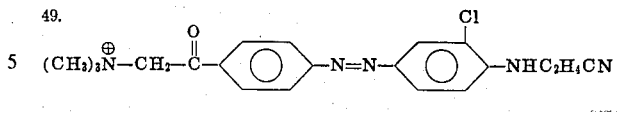

Disclosed in U.S. Pat. No. 2,821,526.

50. 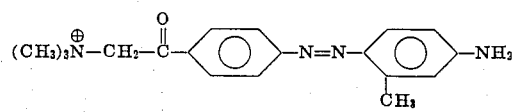

Disclosed in U.S. Pat. No. 2,821,526.

51. 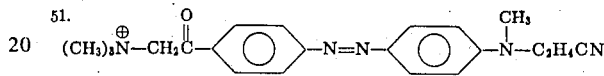

Disclosed in U.S. Pat. No. 2,821,526.

52. 

Disclosed in U.S. Pat. No. 2,821,526.

53. 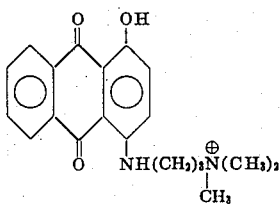

Related to the dyes in U.S. Pat. No. 2,183,652. Preferably obtained as the HCl salt.

54. 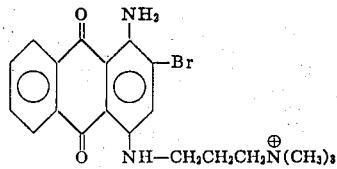

Disclosed in U.S. Pat. No. 2,716,655.

55. 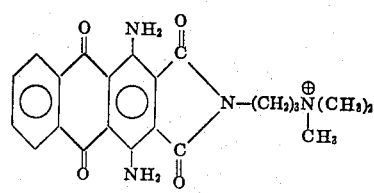

The quaternary dyes off U.S. Pat. No. 2,701,802, preferably obtained as the HCl salt.
56.
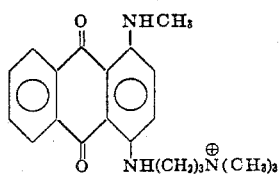
Similar to the dyes of U.S. Pat. No. 2,153,012.
57.
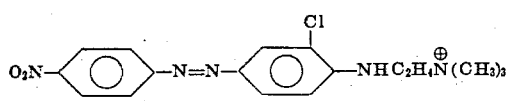
58.
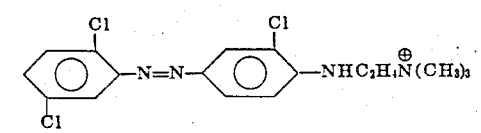
59.
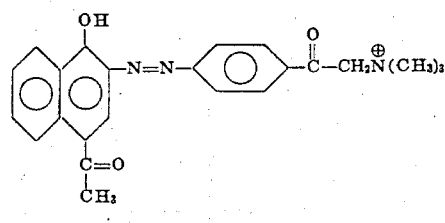
60.
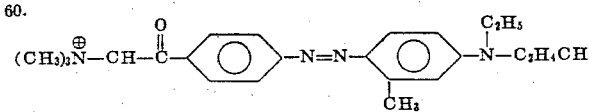
61.
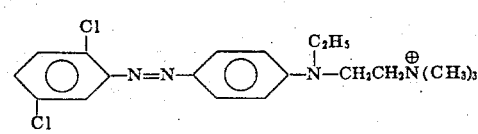
62.
63.
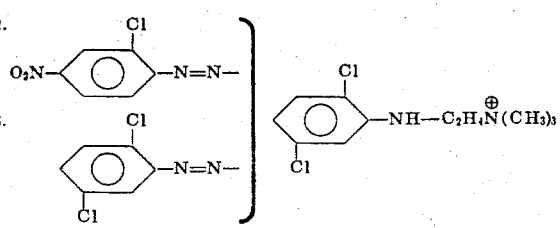
64.
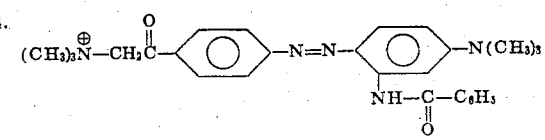
Disclosed in U.S. Ser. No. 560,867, filed June 27, 1966.
65.
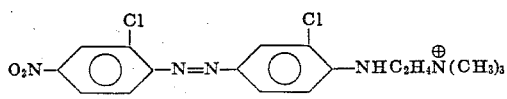
66.
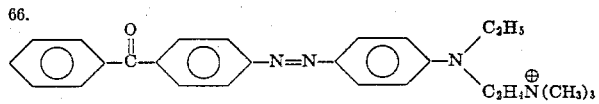
Disclosed in U.S. Ser. No. 490,053, filed Sept. 24, 1965.
67.
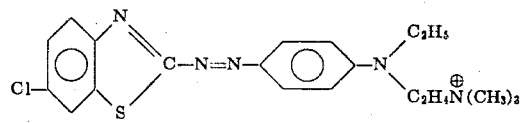
Disclosed in U.S Ser. No. 494,875, filed Oct. 11, 1965.
68.
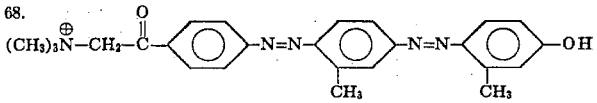
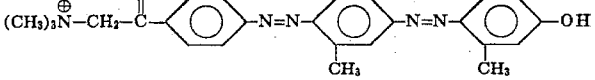
Disclosed in U.S. Pat. No. 3,020,272.
69.
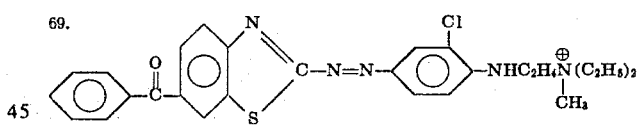
Disclosed in U.S. Ser. No. 494,875, filed Oct. 11, 1965.
70.
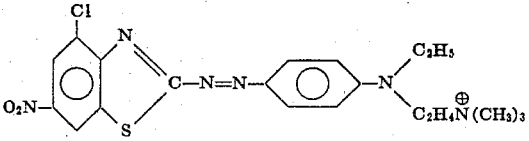
Disclosed in U.S. Ser. No. 494,875, filed Oct. 11, 1965.
71.
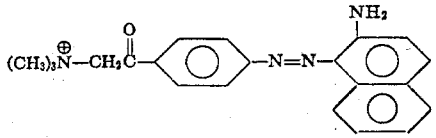

Disclosed in U.S. Pat. No. 3,074,926.

72.
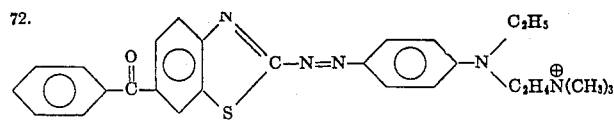

Disclosed in U.S. Ser. No. 494,875, filed Oct. 11, 1965.

73.
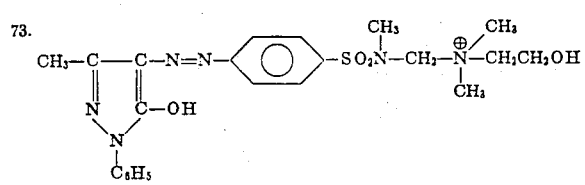

74.
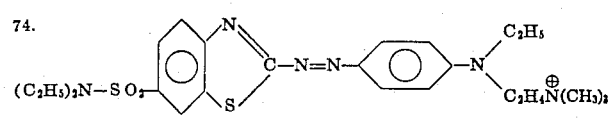

75.
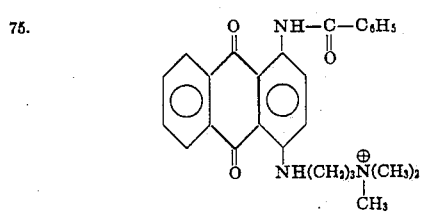

76.
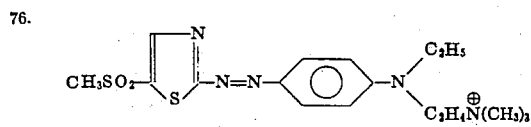

Disclosed in U.S. Pat. No. 3,033,847.

77.
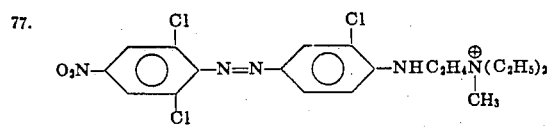

Disclosed in U.S. Pat. No. 3,079,377.

78.
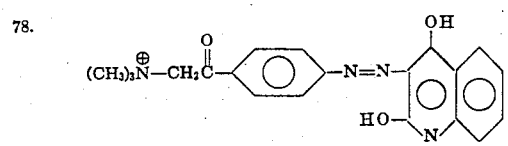

Disclosed in U.S. Pat. No. 2,965,631.

79.
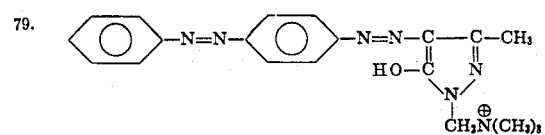

80.
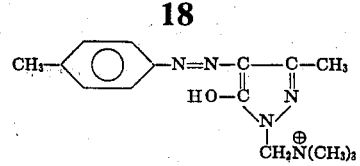

Dyes 79 and 80 are described in copending application of Clarke, filed Nov. 6, 1967, Ser. No. 680,994.

81–82. Quaternary derivatives of the dyes described in U.S. Pat. No. 2,022,921, as

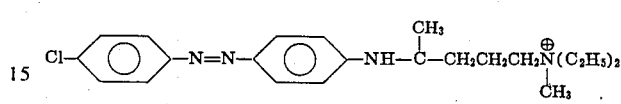

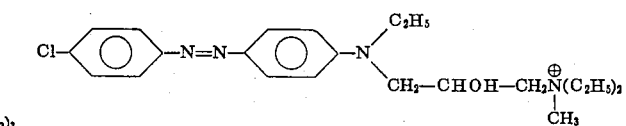

83. Quaternary dyes of U.S. Pat. No. 2,099,525, as

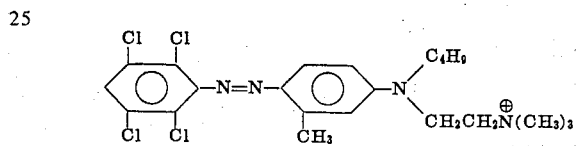

84–87. Quaternary dyes, described in U.S. Pat. No. 2,238,485, as

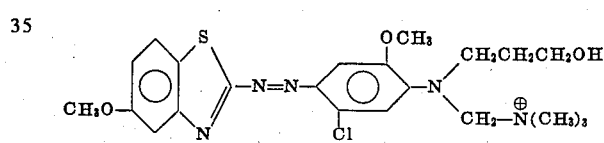

or quaternary derivatives as

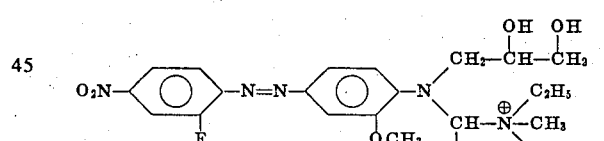

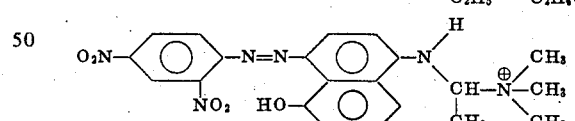

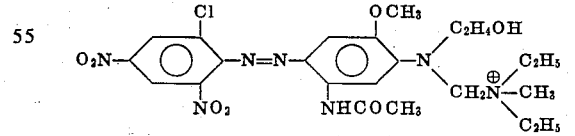

88–89. The mono-cationic dyes of U.S. Pat. No. 2,945,849, as

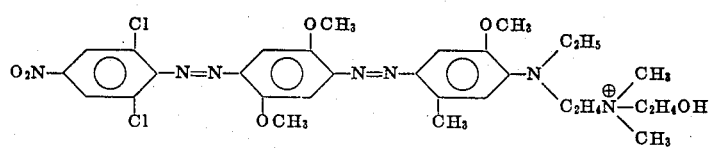

corresponding quaternary derivatives as

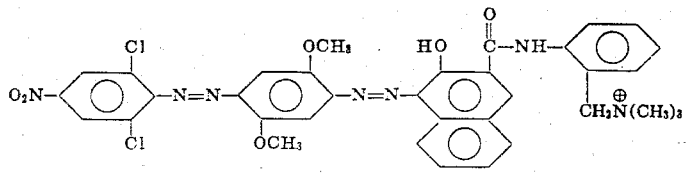

90–91. The non-metalized, quaternary derivatives of the dyes of U.S. Pat. No. 3,096,318, as

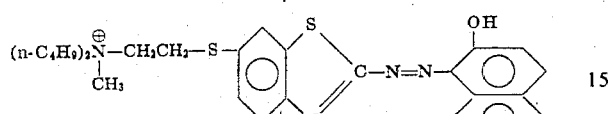

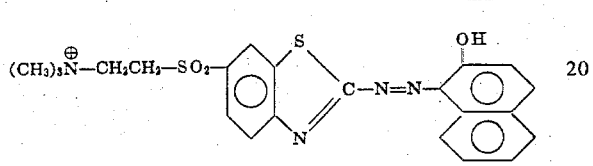

92–93. The non-metallized, quaternary derivatives of the dyes of U.S. Pat. No. 3,099,652, as

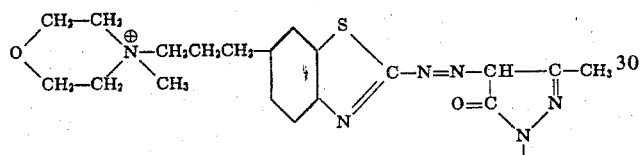

and

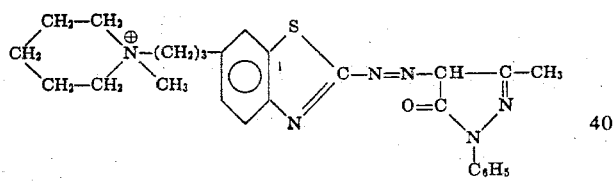

94. The quaternary derivatives of the dyes of U.S. Pat. No. 3,099,653 as

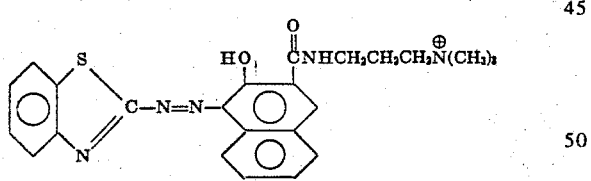

95–97. The quaternary derivatives of the dyes of British Pat. No. 459,594, as

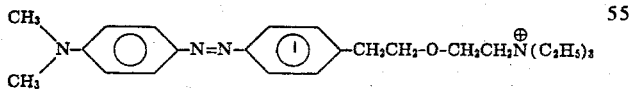

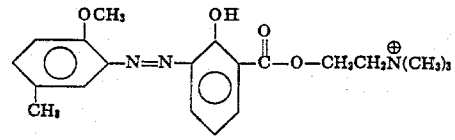

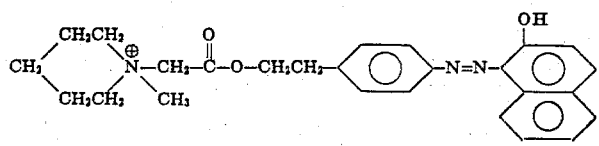

98. The dyes of French Pat. No. 1,271,416, as

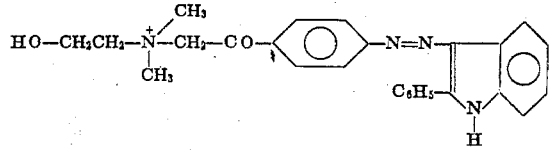

99. The dyes of French Pat. No. 1,295,862, as

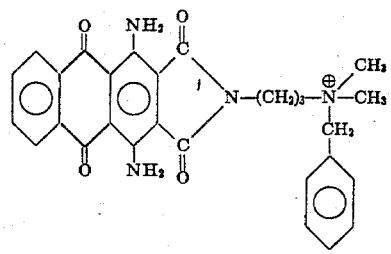

100. The quaternary dyes of U.S. pat. No. 2,701,801, as

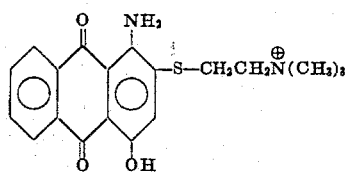

101. The quaternary dyes of Belg. Pat. No. 609,667, as

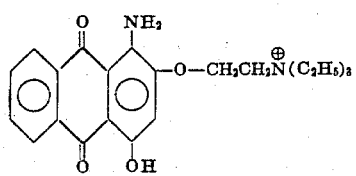

102. The quaternary dyes of U.S. Pat. No. 2,737,517, as

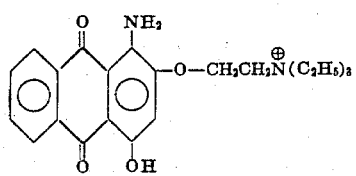

103. The quaternary dyes of British Pat. No. 1,016,371, as

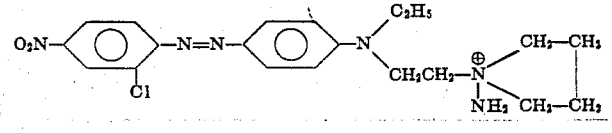

The preceding list of dyes should not be construed as being restrictive. The list is intended to exemplify the wide variety of chromophores applicable in this invention, e.g., monoazo, disazo, heterocyclic diazo or coupler, anthraquinone, quinophthalone, diphenylamine, etc. Indeed, it is believed that all of the dyes disclosed in the foregoing references having localized, pendant positive charges will form stable, water-insoluble pastes as described subsequently, and all such disclosure of the foregoing references are incorporated herein. The alkylene group serves as an insulator since it is bonded to neighboring atoms through sigma bonds and does not possess pi electrons, nor an unshared electron pair, available for delocalization, i.e., resonance, with the positive charge.

2. The Anion ArSO$_3^\ominus$

The cationic dyes discussed in Part B(1) immediately above are most commonly taught in the patent literature as possessing adequate water solubility. Water solubility is achieved by preparing the dye as salts with anions usually selected from the following list: $Cl^\ominus$, $Br^\ominus$, $HSO_4^\ominus$, $H_2PO_4^\ominus$, $\frac{1}{2}SO_4^\ominus$, $ZnCl_3^\ominus$, $CH_3SO_3$, $C_4H_9-SO_3^\ominus$, $CH_3-O-SO_3^\ominus$, $C_2H_5-O-SO_3C_6H_5-SO_3^\ominus$, $CH_3-C_6H_4SO_3^\ominus$ (ortho or para), $HCOO^\ominus$, $CH_3-COO^\ominus$, $C_2H_5-COO^\ominus$, $C_3H_7-COO^\ominus$, $Cl-CH_2-COO^\ominus$, $C_6H_5-COO^\ominus$, the lactate, oxalate, tartrate or citrate ion. When produced with these ions, the dyestuffs are sufficiently soluble in water to be applicable to polyacrylonitrile fibers from aqueous solution.

In the present invention, selected substituted carbocyclic aryl sulfonates, $ArSO_3^\ominus$, are employed in place of the water-solublizing anions disclosed above. These selected arylsulfonates provide tight salts with the cationic dye which are water-insoluble at room temperature, may be dispersed with selected anionic dispersing agents, are compatible (i.e., do not co-precipitate by ion exchange) with acid dyes, anionic thickeners, and like ingredients of pad baths, and which fulfill the objectives of this invention as stated previously. In particular, they may be applie applied a continuous Thermosol technique to acid-modified polyacrylonitrile and polyesters.

The substituents permissible on the carbocyclic arylsulfonate may vary widely. It has been found that permissible substituents on the aryl sulfonates are those whose combined effect increases the acidity of the corresponding benzoic acids to a certain degree. More specifically, it has been found that any substituents which increase the acidity of benzoic acids, in an aqueous medium, by at least 0.6 of a pKa unit, when added together, are useful substituents for the carbocyclic aromatic sulfonic acids used as complexing anions for the localized pendant charged cations in this invention. Thus, on pages 592-593 of the "Determination of Organic Structures by Physical Methods," Vol. I, by Braude and Nachod, published by Academic Press, Inc., New York, 1955, is a table listing pKa increments for various substituents. Any of the listed substituents may be employed so long as their pKa sum has a value of −0.6 or less. Thus, as readily seen from inspecting pages 592-593, this requirement is readily fulfilled by three preferred complexing agents, as follows:

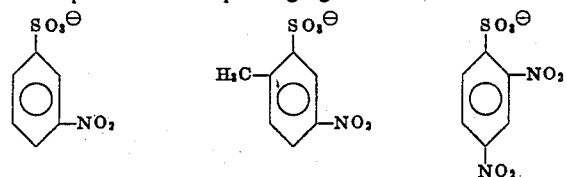

$\Delta pKa = -0.75$   $\Delta pKa = -1.04$   $\Delta pKa = -2.79$

In addition, the following monosubstituted benzenesulfonic acids may be employed as complexing anions useful in attaining the objectives of this invention

|  | ΔpKa |
|---|---|
| o-, p-nitrobenzenesulfonate | −2.03, −0.76 |
| m-, p-cyanobenzenesulfonate | −0.6, −0.65 |
| p-methysulfamylbenzenesulfonate | −0.68 |
| o-iodobenzenesulfonate | −1.34 |
| o-bromobenzenesulfonate | −1.35 |
| o-chlorobenzenesulfonate | −1.26 |
| o-fluorobenzenesulfonate | −0.93 |
| o-phenoxybenzenesulfonate | −0.67 |
| o-phenylbenzenesulfonate | −0.74 |
| o-t-butylbenzenesulfonate | −0.74 |

The list for operable polysubstituted carbocyclic aromatic sulfonates becomes much larger since the effects appear to be additive, as previously illustrated with two of the three preferred complexing agents. For example, the following complexing anions may be specifically mentioned as applicable:

|  | ΔpKa |
|---|---|
| 3-methylsulfonyl-5-chlorobenzenesulfonate | −0.93 |
| 3-trifluoromethyl-6-ethylbenzenesulfonate | −0.84 |
| 2,4-, 2,5-, 3,5-dichlorobenzenesulfonate | −1.47, −1.63, −0.74 |
| 2-methoxy-4-methylsulfonylbenzenesulfonate | −0.79 |

These polysubstituted benzenesulfonic acids, useful in this invention, are also suggested by the data on pgs. 594-594 of the Braude reference. On these two pages, pKa values, are listed as compared to the reference, benzoic acid itself. Since a lower pKa than benzoic acid, 4.20, indicates a stronger acid than benzoic, a simple subtraction of the listed values from 4.20 gives the ΔpKa. Thus, based on pages 594-595, the following benzene-sulfonates are also applicable in this invention. Many of these pKa values are somewhat surprising based on the values given for the monosubstituted benzoic acids shown on page 592-593. These apparent anomalies are usually rationalized on the basis of steric effects, as well as their electrical, i.e., inductive and resonance effects.

|  | ΔpKa |
|---|---|
| 2,6-dimethylbenzenesulfonate | −0.99 |
| 2,4-dibromobenzenesulfonate | −1.50 |
| 2,5-dinitrobezenesulfonate | −2.58 |
| 3,4-dinitrobenzenesulfonate | −1.38 |
| 4-nitro-3-methylbenzenesulfonate | −0.69 |
| 2,4,6-trimethylbenzenesulfonate | −0.77 |
| 2-nitro-4,5-dimethoxybenzenesulfonate | −1.71 |
| 2,3-dinitro-5,6-dimethoxybenzenesulfonate | −2.84 |

Additional substituted compounds are effective in this invention. Several are listed below with reference to their Hammett sigma constants. The pKa limitation is not being changed here since the Hammett sigma constants can be derived from the degree of dissociation, i.e., ionization or pKa of substituted benzoic acids in an aqueous medium. A convenient list of Hammett sigma constants is available on p. 87 in "Physical Organic Chemistry," 2nd Edition, by J. Hine, McGraw-Hill Book Co., Inc., 1962. Using Hammett sigma constants, the requirement is that sigma be equal to or greater than +0.6. This requirement is the equivalent of the requirement that the sum of the pKa's be equal to or less than −0.6. Thus, the following compounds may be cited:

|  | Hammett sigma value |
|---|---|
| 3,5-dicarbomethoxybenzenesulfonate | +0.64 |
| 3,5-dicarboethoxybenzenesulfonate | +0.74 |

3,5-disulfonamidobenzenesulfonate +0.92
3-acetoxy-5-acetylbenzenesulfonate +0.77
3-chloro-4-benzoylbenzenesulfonate +0.83
3-methylsulfoxy-5-acetamidobenzenesulfonate +0.73
3-methylthio-5-nitrobenzenesulfonate +0.86
3-sulfonamido-4-p-nitrophenylbenzenesulfonate +0.72

Finally, several compounds are readily applicable as anions in this invention, for which ionization data is not conveniently found in the literature. Thus, in changing from benzene to naphthalene sulfonates, more than just the ionization constant must be considered to describe the effect on the solubility of the cationic dye salts. For example, although the pKa values of benzoic acid and β-naphthoic acid are similar (3.20 and 3.16, respectively), the latter is 30 times less soluble. Since β-naphthoic acid is more insoluble than benzoic acid, it is clear that any substituents on the β-napthoic acid whose pKa sum is equal to or less than −0.6 will be operable in this invention. Some such compounds include the following commercially available carbocyclic aromatic sulfonates:

5-, and 8-acetamido-2-naphthalenesulfonate
1-, and 2-anthraquinonesulfonate
2-chloro-3,5-dinitrobenzenesulfonate
2-chloro-5-nitrobenzenesulfonate
4-chloro-3-nitrobenzenesulfonate
8-cyano-1-naphthalenesulfonate
1-, and 2-naphthalenesulfonate
5-, and 8-nitro-1-naphthalenesulfonate
5, and 8-nitro-2-naphthalenesulfonate
2,6-dimethyl-8-, and -3-naphthalenesulfonate
Acenaphthene-3-sulfonate

C. THE ANIONIC DISPERSING AGENTS

The dyes of Part A(1) and the carbocyclic aromatic sulfonates of Part A(2), and the dyes of Part B(1) and the sulfonates of Part B(2) are each combined to yield water-insoluble salts. The ion pair formed between the cationic dyes and the $ArSO_3^\ominus$ or $Ar'SO_3^\ominus$ complexing agent is a very tight, i.e., very slightly dissociated, ion-pair. Thus, it is possible to prepare stable, high-concentrated dispersions of these ion-pair salts dispersed with an anionic dispersant.

The choice of the anionic dispersant is important. A dispersant is needed which is relatively non-foaming and will not stain any fibers in a blend to be dyed. The dispersant should be one which is useful i.e., compatible, with a very wide range of dyes of widely varying type. In particular, the dispersant, since it is anionic, must not compete excessively with the carbocyclic aromatic sulfonate originally present in the ion-pair salt, since severe competition, i.e., ion exchange, would destroy or seriously limit the dispersion stability. In addition, since the cationic dye-arylsulfonate salts are water-insoluble, they must be finely dispersed to provide stable products for the dye industry. Furthermore, due to the desirability of lower-cost dyes, the use of economical dispersing agents, in the pastes of this invention, is preferred.

Dispersants which satisfy all these requirements are the lignin sulfonates and salts of sulfonated naphthalene-formaldehyde condensates. These dispersing agents are well known and are well suited for use in this invention. They are particularly adaptable for use in this invention because the salts are sufficiently insoluble to be compatible with the lignin sulfonate and sulfonated napthalene-formaldehyde condensate, and the salts have a sufficiently high melting point to permit milling and to provide stability at 40° to 50°C. (usual storage or heated pad bath temperature). Salt-forming arylsulfonates containing greater than about eight aliphatic carbon atoms are not particularly useful in producing the water-insoluble salts. Some common trade names linked to readily available commercial lignin sulfonates are as follows:

"Polyfon" - sodium salt of sulfonated lignin (West Virginia Pulp and Paper Co.)
"Reax" - sodium salts of sulfonated lignin derivatives-(West Virginia Pulp and Paper Co.)
"Marasperse" - partially desulfonated sodium lignosulfonate - (American Can Company) "Polyfon" 0 (which contains 1 mole sulfonation per lignin unit of 840 gms.), chiefly because of its low cost and utility, is a preferred dispersing agent.

Some common trade names of readily available sulfonated naphthalene-formaldehyde condensates are as follows:

"Blancol" (sodium salt) and "Blancol" N (sodium salt) - General Aniline and Film Corp.; and
"Daxad" 11KLS (polymerized potassium salt of alkyl naphthalene - sulfonic acid);
No. 15 (polymerized sodium salt of alkyl naphthalene-sulfonic acid);
No. 17 (polymerized sodium salt of alkyl naphthalene-sulfonic acid in non-dusting granular form).

D. PREPARATION OF THE SALTS

The preparation of the cationic dye-arylsulfonate salts of this invention is carried out by initially preparing an aqueous solution of slurry of the cationic dye associated with its customary, water-solubilizing anions. The slurry or solution is most conveniently prepared by using from 2-8 times as much deionized water by weight, as pure dye, at a temperature of from 20°-70°C., accompanied by stirring for 1-2 hours until solution is complete, or the slurry is uniform.

The cationic dye is then precipitated as the water-insoluble cationic dye-arylsulfonate by adding a slight excess of a molar equivalent of the appropriate selected arylsulfonate, usually as its sodium salt or free acid, over an approximate one-half-3 hour period to the aqueous slurry or solution maintained at approximately 20°-70°C. Upon completion of the addition, the slurry is further agitated approximately 1-3 hours at 20°-70°C., to insure complete precipitation, then cooled to room temperature and filtered.

The filter cake is washed with fairly large amounts of deionized water since it is necessary to essentially completely remove the residual inorganic salts. Since many water-soluble cationic dyes are customarily added as their chloride salts, completion of washing is readily indicated by obtaining an essentially chloride-free wash filtrate. In the event that other inorganic anions were originally associated with the cationic dye, comparable, well-known, simple tests may be substituted for the well-known test for chloride anion. In this manner, yields greater than 80% can be obtained, frequently greater than 90%. The elemental analyses available indicate that the stoichiometry of the cationic dye-arylsulfonate salt is as would be expected to balance the electrical charges, i.e., 1:1.

The pH, during the preparation of the aqueous solution or slurry of most of the water-soluble dyes and the slurry of the water-insoluble arylsulfonate salts, is not critical. The pH may vary from approximately 2-10. The preparation of aryl-sulfonate salts of triarylmethane cationic dyes requires a fairly strong acidic medium, e.g., a pH of about 2–4. That is, in alkaline media, a triarylmethyl carbonium ion would be converted to the unreactive (for salt formation) carbinol derivative. Indeed, whatever the pH during the preparation steps, the washing step with deionized water to eliminate inorganic salts will also nearly completely wash out any excess acidity or alkalinity such that the pH of the resulting wet filter cake is essentially neutral. Since the subsequent milling or dispersing step is accomplished at a pH of approximately 7–9, the washing out of excess acidity is most beneficial.

E. PREPARATION OF THE AQUEOUS DISPERSIONS OF THE SALTS AND THE ANIONIC DISPERSING AGENTS

In preparing the pastes or dispersions of this invention, the usually wet press cake of the cationic dye-arylsulfonate salts is milled with the anionic dispersing agent and sand in the conventional manner. Thus, the press cake is charged into the milling (grinding) apparatus along with dispersant and sand. The dispersant, a lignin sulfonate or sulfonated naphthalene-formaldehyde condensate, is added in proportions varying from approximately 10–200% (by weight) based on the weight of dry, pure cationic dye-arylsulfonate salt. The weight of sand used, based by weight on pure, dry, cationic dye-arylsulfonate salt may vary from approximately 300 to 700%. The water requirements cannot be easily defined except to say they must be adequate to provide a paste of sufficient, but not excessive, fluidity to permit the shearing action of the mill to reduce the particle size to the desired level.

The aqueous suspension is ground (milled) in a sand or colloid mill until the particle size is preferably reduced to approximately 1 micron. The temperature of the mass is usually maintained from approximately 20°–70°C. The pH of the dispersion is approximately 8–9. The time usually required to prepare the dispersion with preferable particle size is approximately 2–5 hours. Such a short time is adequate since the cationic dye-sulfonate salts of this invention are readily dispersed. Upon attaining the desired particle size, which may be as large as 5–50 microns, the aqueous dispersion of dye salts is filtered to separate it from the sand. The dispersions of this invention are obtained as the filtrate, leaving the sand as the filter cake, in which the dispersant is present in amounts of 1–25% based on the weight of solids. Very efficient recovery of the dye salt charged is obtained.

Several additional, optional steps take place between obtaining the filtrate and actually employing it in dye applications. Thus, it is customary to standardize the dispersion to obtain a reproducible, reliable strength relationship between various dye batches. This standardization is frequently arbitrary, usually dependent upon the tinctorial strength of the cationic dye chromophore. With the cationic dye-arylsulfonate salts of this invention, the standardized pastes contain from 5–40%-by-weight pure, dry dye salt.

In the process of standardizing the inventive dye-salt pastes, dextrin, sodium carboxy methyl cellulose, humectants, anti-foam agents, bacteriocides, fungicides, and additional anionic dispersant are frequently added. Typical humectants are glycerol and sorbitol. Various commercial preparations are available for reducing foaming tendencies, as "Nalco" 71-D5, a liquid formula containing polyglycol and fatty acid types of surface active agents, etc. Bacteriocides and fungicides are illustrated by paraformaldehyde, sodium silicofluoride, and commercial preparations such as the sodium salt of pentachlorophenol.

The resulting, standardized aqueous dispersions are stable for at least six months and many are stable for over one year. This outstanding prolonged stability in high concentrations is one of the surprising advantages of this invention over the prior art.

F. PROCESS OF DYEING

The cationic salt components of the dispersions of this invention can be applied to anionic fibers and their blends by several different dyeing methods. A detailed description of each method is included below. To summarize, the dispersed salts can be applied by the Thermosol method sa described in Gibson U.S. Pat. No. 2,663,612. The dispersed cationic salts can be applied by pad-roll to polyethylene terephthalate and acrylic fibers or blends of such fibers with cotton, achieving compatibility with anionic dyes in the latter case; by pad steam and printing, and by the exhaust method.

The anionic polymeric substrates, for which the inventive dye-sulfonate salt dispersions have particular utility, include shaped articles such as acid-modified acrylic fiber having acid sites, for instance the sulfonate-modified acrylic fibers described in U.S. Pat. Nos. 2,837,500, 2,837,501, and 3,173,747; also acid-modified polyester fiber such as polyethylene terephthalate fiber containing metal-sulfonate groups as described in U.S. Pat. No. 3,018,272, the polymer-disclosing portions of which are incorporated herein by reference.

In addition to the acrylic and polyester fibers noted above, other types of fibers are advantageously colored by the dye compositions of the present invention. These include the trade name fibers listed as described in the reference J.Soc. Dyes & Col., 77, No. 12, page 618 (December, 1961).

A wide variety of non-basic dyeable polyester, acrylic, polyamide, and cellulosic fibers may be coemployed since the cationic dye-arylsulfonate salts are designed mainly for the acid-modified acrylic or polyester fiber.

A description of the various dyeing processes in which the compositions of this invention may be employed as follows:

1. Thermosol Method

This method is particularly applicable to fibers known as "Orlon"-42, "Dacron"-64, and to blends such as "Orlon"-42/ viscose rayon, "Acrilan"/cellulose acetate/rayon, "Orlon"-42/ nylon/cotton and "Dacron"-64/"Dacron"-54/cotton. The Thermosol method is, in general well known and offers the advantage of a continuous process which requires only a short contact period. The general process is described in U.S. Pat. No. 2,663,612.

The Thermosol process is particularly applicable to blended fabrics, particularly those containing cellulosic fibers, since during the padding operation, the cationic dye-arylsulfonate salt will be padded on both fibers, i.e., cellulosic and acid-modified synthetic. Since cationic dyes have no affinity for cellulosic fibers, a large amount of dye would be wasted unless considerable transfer of cationic dye-arylsulfonate salt occurred from cellulosic to synthetic. Surprisingly, very good transfer is observed with the compositions of this invention on blended fabrics; indeed, cotton or cellulosic fibers are only slightly stained by the cationic dye-arylsulfonate paste following Thermosol treatment. This characteristic of minimum stain on the cellulosic component is necessary since any residual cationic dye on the cellulosic would yield a fabric with poor lightfastness and poor washfastness.

Moreover, in actual dyeing of blends, the pad bath will usually also contain the vat, fiber-reactive or direct dyes for conventional dyeing of the cellulosic, following Thermosol dyeing continuous fixation of the cationic dye on the acid-modified fiber. That is, following fixation of the cationic dye, the vat dye would be reduced with caustic-hydrosulfite to enable the leuco-vat dye to penetrate the cellulosic fiber. This reducing agent is also a very effective stripping agent of the slight residual cationic dye-arylsulfonate paste on the cellulosic fiber that has not completely transferred to the acid-modified synthetic fiber. This dual role of a conventional procedure for dyeing cellulosic fibers makes the previously mentioned fiber blends preferred.

A more detailed description of a typical actual dyeing procedure in conjunction with vat dyes is as follows: A pad bath solution (10 g./l. dye strength) is prepared by stirring the dispersed cationic salt paste (2 g., 200:100 vs. the conventional cationic powder) into a mixture of 20% Superclear Gum (10 ml.) (a refined solution of natural gums sold by Jacques Wolf and Co.) and 10% Merpol SH (4 ml.) (a nonionic ethylene oxide condensate with a fatty alcohol), then diluting with water to 100 ml. The pH is adjusted to 6.5 to 7.0 by adding either tetrasodium pyrophosphate or monosodium phosphate. The fabric is saturated with the pad bath solution and then squeezed to remove the excess (pick up = 65%). The pad is air dried at 120°F. and then heated in a Thermosol oven at 400° to 430°F. for 90 sec. to fix the dye in the fiber. The Thermosoled pad is then saturated with a solution containing sodium hydroxide (75 g./l.) and sodium hydrosulfite (75 g./l.), then steamed at 215°–225°F. for 1 minute. Any vat dye present is reduced at this point. In addition any of the cationic salt which did not fix in the preceding step is scoured off. After rinsing the pad in cold water, it is then treated at 120°F. for 10 minutes in a sodium perborate solution (2.5 g./l.)) to oxidize the vat dye. After a rinse in cold then hot water, the pad is soaked for 5 min. at about 210°F. in soap solution (0.2% sodium oleate). After another rinse in cold then hot water, the pad is dried. If a vat dye is not co-applied with the invention pastes on "Orlon"/cellulosic blends, the caustic-hydro scour would still be necessary to remove trace stains on the cellulosic fiber; however, the perborate treatment would not be employed.

This commercially valuable, continuous process is possible only since the compositions of this invention can be applied by fast, thermal (Thermosol) techniques, and since the inventive pastes are compatible, in high concentrations, with other pad-bath adjuvants.

The strength and/or shade of the salts when applied by the Thermosol method is much improved over the strength and/or shade of the corresponding conventional powder or heteropoly acid pastes. On 100% "Orlon"-42 fiber, the percent fixation and build-up with increasing dye concentration varies with the anion used. It is possible to achieve nearly quantitative fixation values (95–100%) on 100% acid-modified "Orlon" with selected arylsulfonates.

For fabrics made from intimate blends of polyfibers (polyamides, acrylics, polyesters) with cellulosic (cotton, rayon) fibers, an important styling method is two-tone or cross-dye coloration wherein the component fibers are dyed to contrasting colors or to widely differing shades of the same color. Because of the considerably lower abrasion resistance of the cellulosic fibers compared to the polyfibers, the wearing of garments made from the cross-dyed fabrics induces unsightly color changes (commonly termed "frosting") at the points of most severe abrasion. The color change is always toward the color of the polyfiber component. While the problem has been always troublesome, the situation has become completely intolerable with the advent of durable press. This, by virtue of the high degree of crosslinking induced in the cellulosic fiber, drastically reduces its already low abrasion resistance.

A route toward greatly minimizing the "frosting" problem is the use of a three-component blend of about one-third cellulosic and one-third each of two different polyfibers, each of which is dyeable in many cases, with a specific class of dyes having little substantivity for the other. When disperse dyes are used for one component in a triblend fabric, e.g., for unmodified polyester fiber, cellulose acetate, etc., it must be recognized that disperse dyes are also substantive to nearly all synthetic fibers, whether acid-modified or not. Hence, the acid-modified synthetic fiber is usually dyed to a deep shade with the pastes used in this invention, and the other to a considerably lighter shade. The cellulosic component is dyed to antermediate shade and hue. In use, when the preferential abrasive loss of the cotton occurs at points of severe wear, the combined shade of the two polyfibers tends to mask any color change induced thereby.

The validity of the triblend approach has been demonstrated with the following three combinations of fibers:

1. Polyamide (acid dyes), acid-modified acrylic (cationic dyes), and cotton (direct, vat or fiber-reactive dyes);
2. Basic-modified acrylic (acid dyes), acid-modified acrylic (cationic dyes), and rayon (direct, vat or fiber-reactive dyes);
3. Acid-modified polyester (cationic dyes), standard polyester (disperse dyes), and cotton or rayon (direct, vat or fiber-reactive dyes).
4. Acid-modified acrylic (cationic dyes), cellulose acetate (disperse dyes), and rayon (direct, vat or fiber-reactive dyes).

Because it has not previously been possible to apply cationic dyes satisfactorily by the Thermosol process, the dyeing procedure for the triblend fabrics has been discontinuous; i.e., while the dyeing of two of the fibers could be carried out on a continuous basis, it was necessary to interrupt the process to apply the cationic dyes by a piece dyeing procedure, as in a beck or jig. This requirement has so increased the finished fabric costs that the triblend concept has had only limited commercial adoption. However, the dye compositions of this invention, by virtue of their applicability by the Thermosol process, now permit the coloration of each component of the triblend by an integrated continuous process, thus negating the previous cost disadvantages and consequently permitting the application of the triblend concept to a much broader range of fabric styles and fabric costs.

2. Pad Steam

Pad steam is also a continuous method. One requirement for this method is compatibility with acid and direct dyes which the dye compositions of this invention can accomplish. Another requirement, more difficult to meet, is to achieve full shade and strength dyeings after 30 sec., preferably, or in no longer a time than 2 minutes at about 110°C.

There are two particular advantages which the pad steam technique has over Thermosol pertinent to this application. One, the padded fabric is not dried. As a consequence, during the dyeing of an acid-modified acrylic or polyester blend, it is possible for the dye to transfer via solution from the blended fiber to the anionic fibers. Two, this dyeing method represents a useful continuous method for dyeing "Orlon"-42/ wool blends. Wool cannot be subjected to Thermosol temperatures for it will char. Other fibers and fiber blends adaptable for use by the Pad Steam procedure include "Dacron"-64/ wool, "Orlon"-42/ and "Dacron"-64/"Dacron"-54/cotton.

A typical pad steam procedure is as follows:

A pad bath solution (10 g./l. dye strength) is prepared by stirring the dispersed cationic salt paste (2 g., 200:100 vs. the conventional cationic powder) into a mixture of 20% Super-clear Gum (7.5 ml.), a refined solution of natural gums sold by Jacque Wolf & Co, and 0.1 g. of an alkyl benezene sodium sulfonate, a wetting agent, then diluted with water to 100 ml. The pH is adjusted to 6.5.

The fabric is saturated with the pad bath solution and then squeezed to remove the excess (pick up = 65%). The pad is then steamed at 100°C. for 5 min. after which it is scoured in a soap solution at 140°F. for 15 min. The pad is rinsed in cold then hot water and dried.

If the fabric is a blend containing wool, it is desirable to first wet it out in a 1 g./l/ solution of Alkanol WXN (a modified sodium alkylaryl sulfonate) at 180°F. then squeeze to remove any excess.

3. Pad Roll

The pad roll operation is a semi-continuous method. In this process the fiber is saturated with the pad liquor, squeezed to remove any excess, then rolled and steamed at 100°C. for several hours. Since considerable expense is saved if both fibers can be dyed in one operation, compatibility is very desirable. Heteropoly acid complexes are not satisfactory because they do not build-up well and produce a heavy stain on cotton; however, the compositions of this invention are satisfactory for the pad roll method.

The general procedure used is as follows:

A pad bath containing 40 g./l. of the dispersed cationic dye-aryl sulfonate salt (10–20% A.I.) and 4 g./l. of a wetting agent, such as Merpol SH (a nonionic ethylene oxide condensate with a fatty alcohol), is prepared with the pH adjusted to 6.5. The fabric is saturated with pad bath and squeezed to remove any excess liquor (pick up = 60%). The wet pad is rolled and heated at 100°C. for 4 hours to fix the dye in the anionic fiber. Unfixed dye and other chemicals are removed by a scour in 10% caustic-hydro-solution at 120°F.

The pad is rinsed in clear water and dried.

Fibers adaptable to this process include "Orlon"-42 and "Orlon"-42/cotton.

4. Exhaust Dyeing

It has been possible to dye both fibers of an acid-modified acrylic or polyester blend in one bath by making a careful selection of the dyes used, as well as the temperature of bath at the time of their addition. At higher bath temperatures, above about 160°F., many of the insoluble salts formed by anionic and cationic dyes are completely dissociated. Surprisingly, the cationic complexes of this invention provide complete compatibility with anionic dyes even at room temperature by the exhaust dyeing procedure, which greatly simplifies the dyeing operation. The general procedure used is as follows:

Dyeings are made using a volume of solution approximately 40 times the weight of the fiber. For a 1% dyeing on skeins, the dispersed cationic salt (200:100 versus the standard Powder) is added at 2% the weight of the fiber. The dye bath is prepared by stirring the dye salt into a solution containing 0.5% "Alkanol" HCS, 10% sodium sulfate, about 1% glacial acetic acid (pH = 4.5), and 2% Retarder LAN. The dye bath is held at the boil for approximately 1½ hours. The dyed fabric is then rinsed in cold followed by hot water and dried.

Fibers adaptable to this procedure include "Orlon"-42, "Orlon"-42/cellulosic fibers, "Orlon"-42/nylon/cotton and "Dacron"-64/"Dacron"-54/cotton.

5. Printing

The dispersed cationic dye-arylsulfonate salt (5 pts. containing 10 to 20% A.I.) and citric acid (2 pts.) are mixed into a 3% solution of locust bean gum in water (100 pts.). Other adjuvant may be added (e.g. ZnSCN as an auxiliary for application to triacetate fibers), since the inventive pastes are compatible with the ones commonly employed.

When the printing paste is uniform, it is applied to the fabric and then dried in a hot air oven or over heated drums at 160°–300°F. The dye is fixed to the fibers either by steaming the fabric at 212°–250°F. for 20 to 60 minutes or by Thermosol development at 400°–430°F. for 60 to 120 seconds.

Dyes which have not been fixed to the fabric and other chemicals are removed in a detergent scour (0.5% solution of a sodium alkyl sulfate) at 140°F. The fabric is rinsed in clear water and dried.

G. THE EXAMPLES

Examples I–XXI, which follow, are directed to the preparation and use of dye salts having the formula D $\oplus$ AR'SO$_3^\ominus$ . Description of a dye by number, e.g., Dye 18, in the examples, refers to the dye numbered 18 in the specification.

EXAMPLE I

Preparation of Salt

The carbinol derivative of Dye 18 (100 g., 0.24 mole) was slurried in 600 ml. of deionized water at 20°–25°C. When uniform, 4-nitrotoluene-2-sulfonic acid (65.5 g., 0.3 mole) was slowly added in 5 g. portions over a period of 2 ½ hours. The resulting slurry was held at 20°–25°C. For 3 hours. The pH of the slurry at this point was about 1.0. The precipitate was filtered and washed with 500 to 1000 ml. of deionized water; the pH of the filtrate at the end of the wash was about 2.5. The precipitate was partially dried by suction.

Weight of the wet cake = 300 g.
solids = 40%
calculated dry wt. = 120 g. = 81.1% of theory
M.P. = 142°–145°C.

Dispersion

The above wet cake was milled with 25 g. "Polyfon" O and 750 g. of fine sand. After about 3 hours at 20–30°C. the particle size was reduced to 1μ or less. The sand was filtered off.

Weight of the paste = 636 g.

Estimated recovery based upon the amount of carbinol originally charged = 78% (by spectral measurements).

Standardization

"Dowicide" G (sodium pentachlorophenate) (1 g.) and sodium silicofluoride (1 g.) slurried in $H_2O$ (10 ml.) was dropped into the above paste with agitation. 70% sorbitol (100 g.) was added, and the paste stirred for 15 minutes, then filtered through milk paper to remove large particles.

Spectral strength = 200:100 vs. alternatively standardized powder

λmax = 618 mμ, $a_{max}$ = 21.0/g. in 80% Dimethylacetamide/20% $H_2O$

EXAMPLE II

The same procedure was used as described above in Example I with the following exceptions:

Preparation of Salt

Crude Dye 13 (200 g., 182.6 g. 100%, 0.41 mole) was slurried in deionized water (600 ml.), and 4-nitrotoluene-2-sulfonic acid (91.4 g., 0.42 mole) was slowly added. The product when filtered off was washed with 2 liters of deionized water.

Weight of the wet cake = 554 g.

solids = 37%

Calculated dry weight = 205 g. = 89% of theory

M.P. = liquefies at 108°–109°C.; solidifies on further heating; M.P.= 207°–208°C.

λmax = 526.5 mμ; $a_{max}$ = 126.1/g. in 50% aqueous ethanol

Dispersion

Part of the above wet cake (430 g. = 159 g. dry wt.) was milled with "Polyfon" O (15 g.) and fine sand (750 g.) at 20°–30°C. After milling about 3 hours, the particle size was reduced to 1 μ or less. The sand was filtered and washed with 150 g. of 10% "Polyfon" O solution.

Weight of the dispersed paste = 574 g.

Spectral strength = 80:100 vs. corresponding powder

Standardization

The above paste was stirred and "Polyfon"O(25 g.) was added in deionized water (600 ml.) as was 70% sorbitol (200 g.), "Dowicide" G (2 g.) in water (10 ml.), and sodium silicofluoride (2 g.) in water (10 ml.). After 15 minutes, the paste was filtered through milk paper to remove large particles.

strength = 200:100 vs. corresponding powder

λmax = 527 mμ; $a_{max}$ = 16.94/g. in 50% aqueous ethanol

λmax = 528 mμ; $a_{max}$ = 15.49/g. in 80% DMAC/20% $H_2O$

EXAMPLE III

Preparation of the Naphthalene-2-Sulfonate Salt of Dye 18

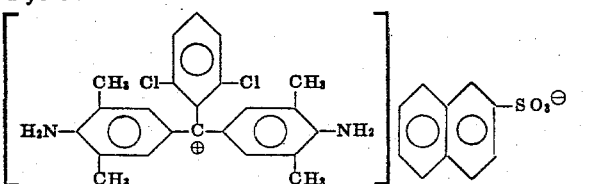

Crude dye 18 carbinol (26 g., 0.06 mole) was slurried in deionized water (100 ml.) at room temperature and dilute HCl was added to bring the pH to less than 2.0. Naphthalene-2-sodium sulfonate (20 g., 0.09 mole) was slowly added over a period of 2 hours and the mixture was stirred at room temperature one-half hour longer. The product was filtered and washed with cold deionized water until the pH of the filtrate became 2.5 and isolated as a wet cake.

Dry yield based on solids = 30.8 g. (81% of Theory).

M.P. = 263°–265°C.

Dispersion

The above cake (5.0 g. dry weight) was milled with "Blancol" (1.0 g.) and fine sand (25 g.) at 50°–55°C. until the particle size was uniform and about 1μ or less (4 to 6 hrs.). The dispersion was diluted with water to reduce the viscosity and the sand filtered off and rinsed with deionized water (7 ml.).

Wt. of the recovered paste = 28.5 g. (about 10% A.I.)

Dyeing

When applied to "Orlon"-42 and "Orlon" blends by the Thermosol method, speck-free uniform pads are obtained similar in shade to aqueous dyeings of the corresponding dye 18 powder.

EXAMPLE IV

Preparation of the 4-Nitrotoluene-2-Sulfonate Salt of Dye 4

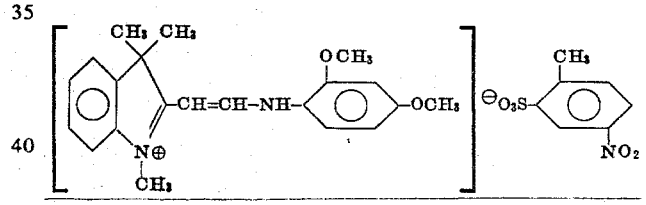

Crude dye 4 (140 g.; 0.38 mole ) was slurried in deionized water (2500 ml.) at room temperature, and when uniform, a wet cake of 4-nitrotoluene-2-sulfonic acid (133 g.; 67.3% 0.46 mole) was slowly added over a period of 6 hours. The mixture was stirred 16 hours at room temperature. The product was filtered and washed with deionized water until the pH of the filtrate was 4.9 and isolated as a wet cake.

Dry yield based on solids = 177 g. (90% of Theory).

M.P. = 199.5°–200°C.

Dispersion

Fine sand (88.5 g.), "Polyfon" 0 (15 g.) and sufficient water to provide fluidity were slurried in a sand mill at room temperature and the above wet cake, containing the crude dye 4 complex (177 g. dry weight) was slowly added mixed with "Polyfon" 0 (5 g.) over a period of 4 hours. The mixture was milled at 40°–50°C. for 1 hour during which time additional "Polyfon" 0 (10 g.) was added. The particle size was uniform and about 1μ or less. After diluting with deionized water (250 ml.) to reduce the viscosity, the sand was filtered off and washed with 10% aqueous "Polyfon" 0 solution (50 ml.). The filtrate was slurried with dextrin (30 g.), sodium silicofluoride (3 g.) and "Dowicide" G (3 g.).

Wt. of paste = 704 g.

Dyeing

When applied to "Orlon"-42/wool or "Dacron-64/wool blends by the pad steam method, speck-free uniform dyeings are obtained similar in shade to aqueous dyeings of standardized dye 4 powder.

EXAMPLE IV

Preparation of the Salt of Dye 4 and Sodium-m-Nitrobenzene-sulfonate

Crude dye 4 (80 g., 0.2 mole) was slurried in 500 ml. of water at 50°-60°C. After about 1 hour when the slurry was uniform, sodium-m-nitrobenzene sulfonate (45 g., 0.2 mole) was slowly added over a period of one-half hour. The mixture was held 3 hours at 50°-60°C., then cooled to room temperature, filtered, washed free of $Cl^\ominus$ with water (250 ml.) and sucked down.

Two runs carried out in the manner gave a total wet cake weight = 572 gms.

solids = 41%

Calculated dry weight = 235 gms.; 99$^+$% of theory based on spectra. $\lambda$max = 416m$\mu$; $a_{max}$ = 87.7/g. in 50% aq. ethanol

M.P. = 144°-146°C.

Dispersion

The above wet cake was milled with "Polyfon" 0 (45 gms.) and fine sand (875 gms.). It was necessary to evaporate off some of the water by allowing the temperature to rise to 60°C. After about 2 hours, the particle size was reduced to 1$\mu$ or less. "Polyfon" 0 (5 g.) was added, and the milling continued one-half hour longer and then filtered through milk paper. The sand was washed with a little deionized water, adding the wash to the filtrate.

Weight of the paste = 684 gm.

Spectral strength = 120:100 vs. standardized dye 4 powder

Calculated recovery of dye based upon the amount of crude orginally charged = 99%.

Standardization

Dowicide G (1 g.) dissolved in water (10 ml.) and sodium silicofluoride (1 g.) slurried in water (10 ml.) were slowly dropped into the above paste with agitation. 70% sorbitol (140 g.) and water (35 ml.) were added, and the paste stirred for 15 minutes, then filtered through milk paper to remove large particles.

Strength = 200:100 vs. standardized dye 4 powder.

$\lambda_{max}$ = 415m$\mu$; $a_{max}$ = 15.9/g. in 50% aq. ethanol

EXAMPLE V

Preparation of the Dimethylisophthalate-5-Sulfonate Salt of Dye C.I.42,000

$$\left[ (CH_3)_2N-\underset{}{\bigcirc}-\underset{\oplus}{C}-\underset{}{\bigcirc}-N(CH_3)_2 \right]$$

$$\underset{\overset{|}{COOCH_3}}{\underset{\overset{|}{COOCH_3}}{\bigcirc}}-SO_3^\ominus$$

A wet cake of the carbinol of the dye represented by C.I. 42,000 (69.3%; 16.0 g.; 0.03 mole) was slurried in deionized water (80 ml.) at room temperature, and when uniform, HCl was added to bring the pH to about 1.0, thus converting the carbinol to the bright green carbonium ion. Di-methylisophthalate-5-sulfonic acid (9.0 g.; 0.033 mole) was added over a period of 2 hours. The product precipitated and was filtered off, washed with deionized water and air dried.

Yield = 20.8 g. (not completely dry)

M.P. = 195°-198°C.

Dispersion

The above product (10 g.) was slurried with sufficient deionized water to provide fluidity in a sand mill. "Polyfon" 0 (1.0 g.) was added and when uniform, fine sand (40 g.). The mixture was milled at room temperature until the dispersion was uniform and the particle size about 1$\mu$. Additional "Polyfon" 0 (2.0 g.) was needed during the milling. The paste was diluted with deionized water to reduce the viscosity, the sand filtered off and rinsed with deionized water (10 ml.).

Weight of paste = 44 g. (about 15% A.I.)

Dyeing

When applied by the Thermosol method to "Orlon"-42 blends, speck-free uniform dyeings are obtained with good strength and build-up. The shade is similar to aqueous dyeings of a standardized, powder-form of C.I. 42,000.

EXAMPLE VI

Preparation of the Salt of Dye 13 and 2,4-Dinitrobenzenesul-fonate $$\left[ \underset{\underset{CH_3}{|}}{\underset{N\oplus}{\bigcirc}}\overset{CH_3\ CH_3}{\underset{|}{\bigcirc}}-CH=CH-\bigcirc-N\underset{C_2H_4CN}{\overset{CH_3}{}} \right]$$

$$O_2N-\underset{\underset{SO_3^\ominus}{}}{\overset{NO_2}{\bigcirc}}$$

Crude dye 13 (91%; 10 g.; 0.02 mole) was dissolved in deionized water (300 ml.) at 50°-60°C., and a solution of 2,4-dinitrobenzene sodium sulfonate (12.3 g.; 65%; 0.03 mole) in deionized water (200 ml.) was slowly added. The product precipitated from solution. The mixture was cooled with agitation to room temperature, the precipitate filtered off and washed with cold deionized water. The salt was vacuum dried at 60°-65°C.

Yield = 11.8 g (97% of Theory)

M.P. = 185°-188°C.

Dispersion

An equivalent amount of product was milled as a wet paste with "Polyfon" 0 (2.0 g.) and fine sand (40 g.) at room temperature until a uniform dispersion was obtained with a particle size of 1$\mu$ or less. The sand was filtered off and rinsed with a small amount of water.

Wt. of dispersed paste = 56 g. (about 12% A.I.)

Dyeing

When applied to "Dacron" 62 in printing formulations, speck-free prints are obtained in full shade. When applied to "Orlon"-42-cotton blends by the pad roll method, speck-free uniform dyeings are achieved in the presence of direct dyes, indicating compatibility with anionic dyes.

EXAMPLE VII

Preparation of the Salt of Dye 24 and 4-Nitrotoluene-2-Sulfonate

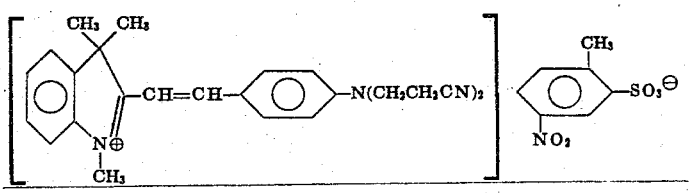

Crude dye 24 (20 g., 0.04 mole) was slurried in deionized water (200 ml.) at room temperature. When the slurry was uniform, 4-nitrotoluene-2-sulfonic acid (15 g.,0.07 mole) was slowly added over a period of 2 to 3 hours, followed by stirring 1 hour longer at room temperature. The product was filtered off and washed acid free to Congo Red paper with cold deionized water. The salt was isolated as a wet cake (81 g., 29.2% solids).

Dry yield based on solids = 23.7 g. (95% of Theory)
M.P. = 182.5°–184°C.

Dispersion

A portion of the above wet cake (4.67 g. dry weight) was slurried in a sand mill with "Polyfon" 0 (0.5 g.). When the slurry was uniform, fine sand was added (25 g.) and sufficient water to provide fluidity. The mixture was milled for about 2 hours at about 40-45°C. The particle size was uniform at the end of this time and about 1μ or less. Additional "Polyfon" 0 (0.5 g.) was added and milled 15 min. longer. The paste was diluted with deionized water to reduce the viscosity, the sand filtered off and rinsed with deionized water (ml.). mo.).

The paste (16 g.; 15% A.I.) was mixed with sorbitol (70%, 2 g.).

Dyeing

When applied to "Orlon"-42 and its blends by the Thermosol method, speck-free uniform dyeings are obtained. The shade is similar to aqueous dyeings of Dye 24 standardized powder.

EXAMPLE VIII

Preparation of the Salt of Dye 11 and 4-Nitrotoluene-2-Sulfonate

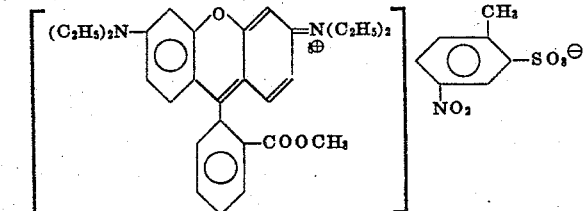

Crude dye 11 (20 g., 80% Purity 0.03 mole was slurried in deionized water (200 ml.) at room temperature. 4-Nitrotoluene-2-sulfonic acid (1.0 g.) was added and stirred 2 hours. Then more 4Nitrotoluene-2-sulfonic acid 9.0 g., 0.046 mole total) was slowly added over a period of 2 hours. Agitation was continued 1 hour longer at room temperature. The precipitate was isolated by filtration and washed with cold water until the filtrate was colorless and acid free to Congo Red paper.

The product was obtained as a high solid (76%) wet cake.

Dry yield based on solids = 14.55 g. (66% of Theory)
M.P. = 131°–133°C.

Dispersion

A portion of the above wet cake (5.3 g. dry weight) was slurried with "Polyfon" 0 (0.5 g.) in a sand mill at room temperature. When the slurry was uniform, fine sand (35 g.) was added and the mixture milled at room temperature. After milling 6 hours, additional "Polyfon" 0 (0.5 g.) was added and milling continued 1 hour longer. The particle size was uniform and about 1μ or less. The paste was diluted with deionized water to reduce the viscosity, the sand filtered off and rinsed with water (5 g.).

Dyeing

The paste (20 g., about 15% A.I.) was mixed with sorbitol (70%, 5 g.). When applied by the Thermosol method to "Dacron" 64 and its blends, speck-free uniform bright red dyeings with good fixation, build-up and fastness are obtained. The shade is similar to aqueous dyeings of standardized dye 11 powder.

EXAMPLE IX

Preparation of the Salt of Dye 23 and 4-Nitrotoluene-2-Sulfonate

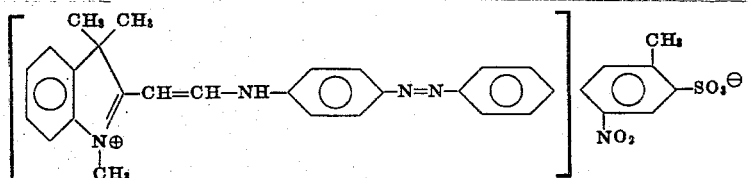

Crude dye 23 (20 g.; 0.05 mole) was slurried in deionized water (200 ml.) at room temperature. When the slurry was uniform, 4-nitrotoluene-2-sulfonic acid (12.5 g., 0.06 mole)was slowly added over a period of 2 hours. After stirring 1 hour longer at room temperature, the product was isolated by filtration, and washed acid-free to Congo Red paper with deionized water. The product was isolated as a wet cake.

Dry weight based on solids = 18.8 g. (66% of Theory)
M.P. = 207°–209°C.

Dispersion

A portion of the above wet cake (3.8 g. dry weight) was slurried in a sand mill at room temperature with "Polyfon" 0 (1.0 g.) When the slurry was uniform, fine sand (25 g.) was added and the mixture heated to 50°–55°C. Additional "Polyfon" 0 (1.0 g.) was added during the milling. When the particle size appeared uniform and about 1μ or less, the milling was cooled to room temperature. The sand was filtered off and rinsed with 2% aqueous "Polyfon" 0 solution (15 g.).

Dyeing

The recovered filtrate and wash, (39.5 g.; about 7.5% A.I.) when applied by the Thermosol method to "Dacron" 64, provide speck-free uniform dyeings with good build-up and lightfastness. The shade is similar to aqueous dyeings of dye 23 standardized powder.

EXAMPLE X

Preparation of the Salt of Dye 32 and 2,4-Dinitrobenzene-Sulfonate

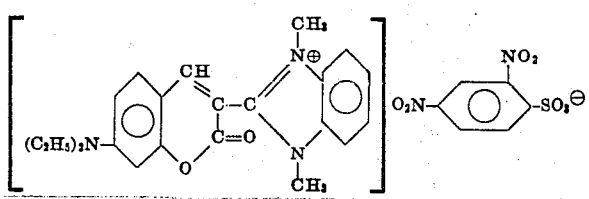

Crude dye 32 (1.0 g.; 0.003 mole) was slurried in deionized water (10 ml.) at room temperature. A solution of sodium 2,4-dinitrobenzene sulfonate (1.0 g.; 0.004 moles) in deionized water (10 ml.) was slowly added at 30°–40°C. A course precipitate formed. The mixture was stirred at 30°–40°C. for 45 min., followed by filtering off the product and washing with 100 ml. of deionized water. The product was isolated as a wet cake.

Dry yield based on solids = 1.1 g. (70% of Theory)
Melting point = 227°–229°Co
$a_{max} = 90.7$; $\lambda max = 435$ m$\mu$ in 80:20 DMAC-$H_2$O
Dispersion A portion of the above wet cake (1.056 g. dry) was milled with "Polyfon" 0 (0.1 g.) and fine sand (5.0 g.) at 50°–55°C. Additional "Polyfon" 0 (0.2 g.) was needed during the course of the milling to provide a uniform dispersion with a particle size of about 1$\mu$. The milling was cooled to room temperature and the sand filtered off. The sand was reslurried with 2% aqueous "Polyfon" 0 solution and dextrin (1.0 g.). When the slurry was uniform, the sand was filtered off. Both filtrates were collected and mixed.

Weight of paste = 13.0 g. (about 5–7% A.I.)
Dyeing

When applied to "Orlon"-42 or its blends by the Thermosol method, speck-free uniform dyeings are obtained in heavy bright greenish yellow shades similar to aqueous dyeings of standardized dye 32 powder.

EXAMPLE XI

Preparation of the Salt of Dye 34 and 4-Nitrotoluene-2-Sulfonate

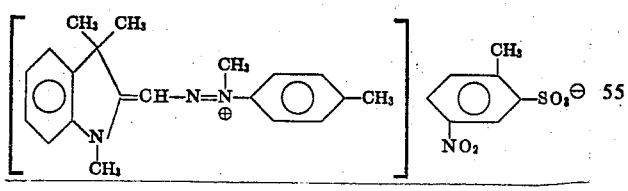

Crude 34 (5.0 g.; 0.01 mole) was slurried in deionized water (100 ml.) at 50°–55°C. and 4-nitrotoluene-2-sulfonic acid (3.0 g.; 0.014 mole) was slowly added over a period of 1¼ hours. The product precipitated from solution; the mixture was stirred 10 min. longer at 50°–55°C., and then cooled with slow agitation to room temperature. The precipitate was isolated by filtration and washed acid-free to Congo Red paper with deionized water. The salt was isolated as a high solids (65%) wet cake.

Yield on a dry basis = 6.27 g. (about 100% of Theory)

The dry product is reddish yellow; M.P. =224°–227°C.;

$a_{max} = 79.2$, $\lambda_{max} = 438$ m$\mu$ in 80:20 DMAC-$H_2$O.
Dispersion

The above product was slurried as a set cake in a sand mill with sufficient water to provide fluidity. The pH was adjusted to 10.2 with concentrated NH$_4$OH (1 drop), "Polyfon" 0 (0.5 g.) added and when the slurry was uniform, fine sand (50.g.) added. The mixture was heated to 50°–55°C. and milled for 4 hours. At the end of this time the particle size was uniform and about 1$\mu$ or less. The sand was filtered off and rinsed with deionized water (5–10 g.).

Dyeing

The combined filtrate and wash containing the dispersed color (29 g.; 15% A.I.), when applied by the Thermosol method to "Orlon"-42 and its blends, provides speck-free uniform dyeings with outstanding lightfastness. The shade is similar to aqueous dyeings of standardized dye 34 powder.

EXAMPLE XII

Preparation of the Salt of Dye 22 and 2,4-Dinitrobenzene Sulfonate

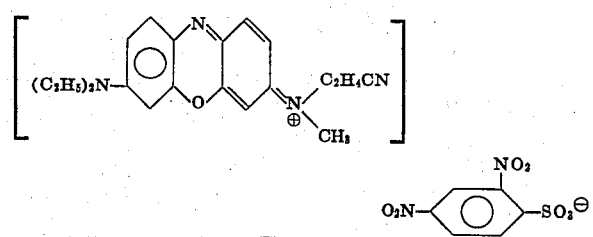

Crude dye 22 (10 g., 0.03 mole) was slurried in deionized water (80 ml.), and when uniform 2,4-dinitrobenzene sodium sulfonate (12 g.;0.04 mole) was slowly added, breaking any large lumps that formed. After stirring 1 hour longer at room temperature, the precipitate was filtered and washed with cold water. The product was isolated as a high solids (87%) wet cake.

Dry yield based on solids = 11.3 g. (61% of Theory)
Melting Range = 170°–180°C. (d)
Dispersion The above product was milled as a wet paste (8.7 g. dry weight) with "Polyfon" 0 (1.0 g.) and fine sand (25 g.) at room temperature. To achieve a uniform dispersion with a particle size of about 1$\mu$, additional "Polyfon" was needed (0.5 g.). The sand was removed by filtration.

Wt. of paste = 35 g. (about 12% A.I.) The paste was slurried and "Polyfon" 0 (2.0 g.) and sorbitol (70%, 5 g.) mixed in.

Dyeing

When applied to "Orlon"-42 and its blends by the Thermosol method, speck-free uniform dyeings are obtained similar in shade to aqueous dyeings of standardized Dye 22 powder.

Table I, immediately following, shows additional dispersions which may be prepared as generally described in the foregoing examples:

TABLE I

| Example | Cation | Anion | Dispersant | Application method |
|---|---|---|---|---|
| XIII | Dye 15 | chlorobenzene sulfonate | Lignin sulfonate as Marasperse CB. | Thermosol on "Dacron"-64. |
| XIV | Dye 31 | 2,4-dinitrobenzene sulfonate | Lignin sulfonate as "Polyfon" O. | Pad roll. |
| XV | Dye 33 | 2,4-dinitrobenzene sulfonate | Naphthalene sulfonic acid formaldehyde condensate as "Blancol". | Thermosol. |
| XVI | Dye 26 | nitrobenzene sulfonate | Lignin sulfonate as "Polyfon" H. | Exhaust. |
| XVII | Dye 21 | 4-cyano-2-carbethoxybenzene sulfonate | Lignin sulfonate as "Polyfon" O. | Thermosol. |
| XVIII | Dye 36 | 2-cyano-4-trifluoromethylbenzene sulfonate | Lignin sulfonate as "Reax." | Pad steam. |
| XIX | Dye 35 | 2,4-dibromobenzene sulfonate | Naphthalene sulfonate and formaldehyde condensate as "Compound S". | Pad steam. |

TABLE I—Continued

| Example | Cation | Anion | Dispersant | Application method |
|---|---|---|---|---|
| XX | [structure: Derivative of Dye 28 — methoxybenzothiazolium N-methyl, —N=N—C₆H₄—N(CH₃)₂] | [structure: 2,5-dichlorobenzenesulfonate] | Lignin sulfonate as "Polyfon" O. | Pad steam. |

EXAMPLE XXI

The following analytical data, set forth in Table II below, are presented to show the structural assignment to the salts used to prepare the pastes of this invention, as 1:1 cationic dye-arylsulfonates.

a determination of the particle size led to the same result.

Using a procedure similar to the one above, the following additional salts of dye 43 have been prepared:

\*1. naphthalene-2-sulfonate       M.P. 275°–276°C.

TABLE II

| Dye | Salt-forming agent | M.P., °C. | $\lambda_{max}$ | $\epsilon g.$ | Calculated | | | | | Found | | | | |
|---|---|---|---|---|---|---|---|---|---|---|---|---|---|---|
| | | | | | C | H | N | S | Cl | C | H | N | S | Cl |
| (a) 4 | 2,4-dinitrobenzenesulfonate | 228–230 | 370 | 58.9 | 55.5 | 4.8 | 9.6 | 5.5 | | 55.4 / 55.7 | 4.8 / 5.0 | 8.0 / 8.1 | 5.3 / 5.3 | |
| (b) 4 | 2,5-dichlorobenzenesulfonate | | | | | 4.8 | 5.5 | 12.1 | | 5.1 | 5.6 | 12.7 | | |
| (c) 20 | 2,4-dinitrobenzenesulfonate | | 770 | 87.6 | 58.7 | 4.2 | 14.1 | 4.6 | | 59.4 / 59.4 | 4.3 / 4.4 | 13.6 / 13.5 | 3.9 / 3.9 | |

Examples XXII–XXXVI, which follow, are directed to the preparation and use of dye salts having the formula K ArSO₄.

EXAMPLE XXII

Preparation of Salt

Crude Dye No. 43 (100 g., 0.23 mole) was slurried in 540 ml. of water at 50–60°C. After about 1 hour, when the slurry was uniform, sodium-m-nitrobenzene sulfonate (81.4 g., 0.36 mole) was slowly added over a period of one-half hours. The mixture was held 3 hours at 50°–60°C., then cooled to room temperature, filtered, washed Cl⊖ free with water (250 ml.) and sucked down.

The salt was dried.
Weight = 130 g. = 93.4% of theory
M.P. = 193°–195°C.
$\lambda_{max}$ = 490 m$\mu$; $a_{max}$ = 51.9 g. in DMF.

Dispersion

The above salt (200 g.) was milled with water (200 g.), "Polyfon" 0 (50 g.), and fine sand (800 g.) for 5 hours. Additional water (300 ml.) was added to reduce the strength and the sand filtered off.
Weight of the paste = 709 g.
No further standardization was needed.
$\lambda_{max}$ = 490 m$\mu$, $a_{max}$ = 13.06/g. in DMF.

Dyeing

When the dispersion is used in printing formulations and applied to "Dacron" 62 then developed by cottage steaming, speck-free uniform prints are obtained. Compatibility with agents used in the operation is thus very good.

This dispersion has also been used in a pad bath containing vat dyes and other dispersed cationic dye arylsulfonate salt. When applid to "Orlon"-42 blends and "Dacron"-64 blends and developed by the Thermosol method, level dyeings are achieved demonstrating versatility in the application method and compatibility with dyes of the same and other classes.

This dispersion when produced had a uniform particle size of 1$\mu$ or less. After standing about 7 months, \*2. p-nitrobenzene sulfonate
\*3. 2,4-dinitrobenzene sulfonate       188°–194°C.
4. 4-nitrotoluene-2-sulfonate          166°–167°C.
5. dimethylisophthalate-5-sulfonate    248–249°C.
\*6. 2,4,6-trichlorobenzene sulfonate   236°–237°C.
7. anthraquinone-2-sulfonate           247°–248.5°C.

When dispersed, all provide level Thermosol dyeings similar in shade to aqueous dyeings of dye 3 powder. Those starred above were also applied by the pad-roll method to "Orlon"-42 cotton fabric providing attractive uniform dyeings similar in shade to aqueous dyeings of the powder.

EXAMPLE XXIII

Preparation of the Salt of Dye 65 and 4-Nitrotoluene-2-Sulfonate

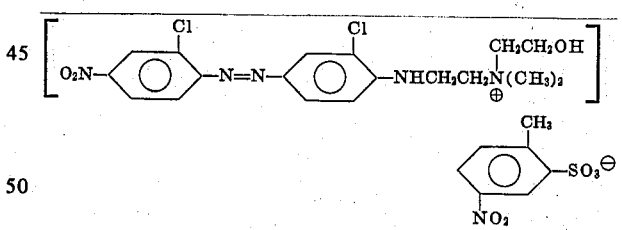

Crude quaternary derivative of dye 65 (5.0 g., 0.01 mole) was slurried in deionized water (100 ml.) at 50°–55°C. 4-Nitrotoluene-2-sulfonic acid (3.0 g.; 0.014 mole) was slowly added over a period of two hours. The product completely precipitated from solution at 50°–55°C., was slurried 1 hour longer at 50°–55°C., and then cooled to room temperature.

The precipitate was filtered and washed acid free with deionized water. It was isolated as a high solids (40%) wet cake.

Yield on a dry basis = 5.6 g. (90% of Theory)

The dry product is dark reddish brown with M.P. = 175°–177°C.

Dispersion

The above product was slurried as a wet cake (5.0 g. dry weight) in a sand mill with sufficient water to provide fluidity. The pH was adjusted to 7.3 with concentrated NH$_4$OH (1 drop). When the slurry was uniform, "Polyfon" 0 (0.5 g.) was added along with fine sand (25.0 g.). The paste was milled at 35-55°C. During the course of the milling, additional "Polyfon" 0 was added (1.5 g.).

When the particle size was uniform and about 1μ, the sand was filtered off and rinsed with water (5 g.).
Dyeing The filtrate and wash, containing the dispersed color, (24 g.; 10% A.I.) when applied by the Thermosol method to "Dacron" 64 and its blends, provides speck-free uniform dyeings with outstanding lightfastness. The shade is similar to aqueous dyeings of dye 65 powder.

EXAMPLE XXIV

Preparation of the Salt of Dye 65 and 4-Nitrotoluene-2-Sulfonate

[structural formula of dye salt]

Derivative below of Dye 65 was slurried (5.0 g.; 0.01 mole) in deionized water (200 ml.) at 20°-30°C.

[structural formula of derivative with Cl⁻]

4-Nitrotoluene-2-sulfonic acid (2.5 g., 0.011 mole) was slowly added over a 1 hour period at 20°-30°C., and agitated at 20°-30°C. 1 hour longer.

The product precipitated as dark red-brown crystals which were filtered and washed nearly acid-free (pH >5.5) with deionized water. The product was isolated as a high solid (30–40%) wet cake.

Yield on a dry basis = 5.5 g. (80% of theory)
M.P. = 214°–216°C.
Dispersion

The dispersion was carried out in same manner as described in Example XXIII.

The dispersion (24 g; 10% A.I.), when applied by the Thermosol method to "Orlon"-42 blends, produces speck-free uniform dyeings similar in shade to exhaust dyeings of the dispersion and dye 65 powder.

EXAMPLE XXV

Preparation of the Salt of Quaternized Dye 55 and 4-Nitro-toluene-2-Sulfonate

[structural formula]

The dye below was slurried (19.5 g.; 0.038 mole) in deionized water (200 ml.) at 50°–55°C.

[structural formula with CH$_3$SO$_4^\ominus$]

4-Nitrotoluene-2-sulfonic acid (9.8 g.; 0.045 mole) was slowly added over a 3-hour period at 50°–55°C. and the paste was slurried one-half hour longer at 50°–55°C. A spot of the slurry on filter paper gave a clear run-out. The slurry was cooled to room temperature.

The precipitated salt was filtered and washed acid-free with deionized water. It was isolated as a high solids (40–50%) wet cake.

Yield on a dry basis = 22.0 gms. (94% of theory)
% sulfur found = 5.05±.05%; calculated = 5.12%.
Dispersion The above dry product was slurried (5.0 g.) in a sand mill with sufficient deionized water to provide fluidity. When the slurry was uniform, "Polyfon"0 (0.5 g.) was added and fine sand (25.0 g.). The paste was milled for about 6 hours at 35°–55°C. inside the mill and room temperature outside. At the end of the time, the particle size was uniform and about 1μ. "Polyfon" 0 (0.5 g.) was added, the viscosity was reduced by adding deionized water and slurried one-half hour longer.

The sand was filtered off and rinsed with 2% aqueous "Polyfon" 0 solution (10 g.). The filtrate and wash, containing the dispersed color, (25 g.; 10% A.I.) when applied to "Orlon"42 or "Dacron" 64 by the Thermosol method, provides speck-free uniform dyeings similar in shade to exhaust dyeings of dye 55 powder.

EXAMPLE XXVI

Preparation of the Salt of Dye 46 and 4-Nitrotoluene-2-Sulfonate

[structural formula]

The dye below was slurried (10.0 g.; 0.018 mole) in deionized water (200 ml.) at 70°C.

[structural formula with CH$_3$SO$_3^\ominus$]

The slurry was filtered to remove trace insolubles then rinsed with hot deionized water (100 ml.). The combined filtrate and wash gelled on cooling.

The filtrate was slurried at 50°–55°C. and 4-nitrotoluene-2-sulfonic acid (5.0 g.; 0.023 mole ) was slowly added over a period of 1 hour. The gel disappeared and fine crystals precipitated. The precipitate was filtered and washed acid-free to Congo Red paper with deionized water.

The reddish yellow product was somewhat tacky. M. P. = 162°–167°C.

Dispersion

Half of the above product was milled with "Polyfon" 0 (1.25 g.) and fine sand (50 g.) at 50°–55°C. After several hours milling the particle size was uniform and about 2μ or less. A few milliliters of deionized water were added to reduce the viscosity, and then the sand was filtered off and rinsed with 2% aqueous "Polyfon" 0 solution.

Wt. of the paste = 36 g.

Dyeing

When this dispersion is applied to "Dacron" 64 blends by the Thermosol method, attractive lightfast yellow dyeings are obtained that are speck-free and uniform.

EXAMPLE XXVII

Preparation of the Salt of Dye 79 and m-Nitrobenzene Sulfonate

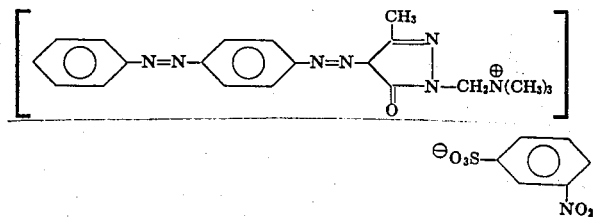

Crude dye 79 (16 g.; 0.04 mole) was slurried in deionized water (80 ml.) at 20°–30°C. Sodium m-nitrobenzene sulfonate (9.0 g.; 0.04 mole) was slowly added over a period of one-half to 1 hour. The slurry was stirred 1 hour longer at room temperature and then filtered; the precipitate was washed with 25 ml. of H₂O to remove NaCl.

Weight of the wet cake = 45.3 g.; solids = 41.1%

Calculated dry wieght = 18.6 g. (82% of theory) M.P. = 197°–198°C.

Dispersion

The above dry product (5 g.) was slurried with sufficient deionized water to provide fluidity and "Polyfon" 0 (1.0 g.) was added. When the slurry was uniform, fine sand (25 g.) was added and the mixture milled for 4 hours at room temperature, whereupon the particle size was uniform and about 1μ or less. More "Polyfon" 0 (0.5 g.) was added and deionized water to reduce the viscosity. The sand was removed by filtration and rinsed with 5 ml. of H₂O.

The filtrate and wash were collected and washed in a filter flask containing 70% sorbitol (10 g.) and 10% aqueous "Polyfon" 0 (10 g.). After mixing, the paste was filtered once again.

Wt. of paste = 53.0 g.

Dyeing

When the above paste is applied to "Orlon" 52 and "Orlon"42 blends by the exhaust method, the fabric is dyed a gold in full strength. When applied to the same fabrics by the Thermosol method, speck-free uniform dyeing are achieved similar in shade to the above dyeings.

EXAMPLE XXVIII

Preparation of the Salt of Dye 49 and m-Nitrobenzene Sulfonate

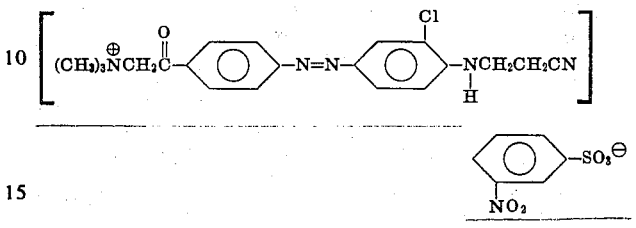

A wet cake of crude Dye 49 (100 g., 0.24 mole ) was slurried in deionized water (600 ml.) at room temperature. When the slurry was uniform, sodium m-nitrobenzene sulfonate (60 g., 93% A.I.; 0.25 mole ) was slowly added over a period of 1 to 2 hours. The mixture was slurried 4 to 8 hours longer after the addition, and then the precipitate was filtered and washed with cold deionized water until the pH of the filtrate was greater than 5.5. The salt was isolated as a wet cake (solids = 25 to 40%)

Calculated yield on a dry basis = 116 g. (83% of theory)

M.P. = 187°–189°C.

Dispersion

The above wet cake of dye 49 -m-nitrobenzene sulfonate (150 g. dry basis) was milled with "Polyfon" 0 (35 g.) and fine sand (750 g.). After milling below 30°C. for about 1 to 2 hours, the particle size was uniform and about 1μ or less. The sand was filtered off and rinsed with 10% aqueous "Polyfon" 0 solution (100 g.).

The filtrate (549 g., 22.3% A.I.) is a bright red-yellow, easy to pour, dispersion. When applied by the Thermosol method ro "Orlon" 42 blends, speck-free uniform dyeings are obtained similar in shade to exhaust dyeings of dye 49 powder.

EXAMPLE XXIX

Preparation of the Salt of Dye 64 and 4-Nitrotoluene-2-Sulfonate

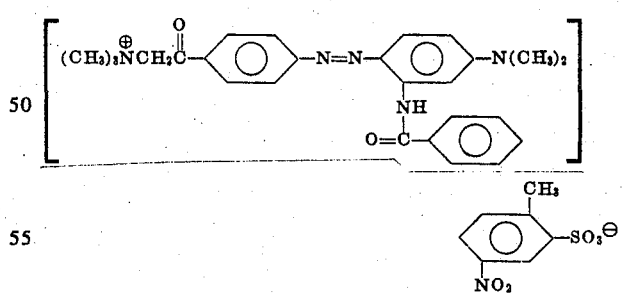

Crude dye 64 (16 g.; 0.033 mole) was slurried in deionized water (80 ml.) at room temperature. 4-Nitrotoluene-2-sulfonic acid (9.0 g.; 0.042 mole) was slowly added over a period of 1 hour. During the addition 10% aqueous NaOH was added to maintain a pH of 6.0 to 7.0 and water was added to keep the slurry fluid (final volume = 250 ml.). After stirring 1 hour longer, the product was filtered and washed until the filtrate was a light red. It was isolated as a wet cake (solid = 28%).

Calculated yield on a dry bases = 16.4 g. (73.5% of theory) M.P. = 223°–225°C.

Dispersion

The above product was slurried as a wet cake (4.2 g. dry weight) with "Polyfon" O (1.0 g.) at room temperature. When the slurry was uniform, fine sand (25 g.) was added and the mixture was milled for about 8 hours at room temperature. The particle size resulting was uniform and about 1μ or less in size.

After diluting with deionized water to reduce the viscosity, the sand was filtered off and rinsed with deionized water (5 ml.).

The filtrate was mixed with 10% "Polyfon" O solution (5 g.) and 70% sorbitol (5 g.).

Weight of paste = 34 g.

When applied to "Orlon" 42 and "Orlon" 42 blends by the Thermosol method, scarlet, speck-free uniform dyeings are obtained similar in shade to exhaust dyeings of the dispersion or dye 64 powder.

Table III, immediately following, shows compositions which can be obtained by the general procedure of the previous examples.

The preceding representative Examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A dye composition comprising an aqueous dispersion of
   1. a water-insoluble salt selected from $D^{\oplus}$ $Ar'SO_3^{\ominus}$ and $K^{\oplus}$ $ArSO_3^{\ominus}$ and 2. an anionic dispersing agent selected from lignin sulfonate or a salt of a sulfonated naphthalene-formaldehyde condensate;

wherein
   $D^{\oplus}$ is a cationic base dye having a delocalized positive charge;
   $K^{\oplus}$ is a cationic dye having a localized pendant positive charge represented by the formula

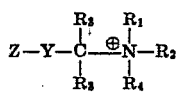

wherein
   Z is a dye nucleus;
   Y is a covalent bond or a divalent connecting linkage selected from alkylene of one to six carbon atoms,

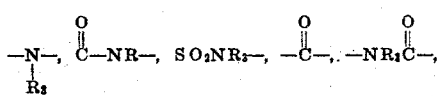

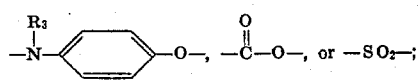

$R_1$ and $R_2$, taken separately, are each selected from lower alkyl, lower cyanoalkyl, lower hydroxyalkyl and aralkyl of 7 to 11 carbon atoms; and, joined together, is a divalent group which forms a heterocyclic ring with the N⊕ nitrogen;

$R_3$ is hydrogen or lower alkyl; and $R_4$ is lower alkyl or $NH_2$;

Ar' is a carbocyclic aromatic moiety of six to 14 ring carbons which is substituted with substituents that are non-ionogenic and whose summation of pKa increments, as measured on benzoic acid derivatives in aqueous medium, is equal to or less than —0.9; and Ar is a carbocyclic aromatic moiety of six to 14 ring carbons which is substituted with substituents that are non-ionogenic and whose summation of pKa increments, as measured on benzoic acid derivatives in aqueous medium, is equal to or less than —0.6.

2. The composition of claim 1 wherein the water-insoluble salt has the formula $D^⊕ Ar'SO_3^⊖$ wherein D⊕ and Ar' are defined as in claim 1.

3. The composition of claim 2 wherein D⊕ is the cationic dye derived from a diphenylmethane, triarylmethane, xanthene, acridine, thiazole, indamine, azine, oxazine, thiazine or an azo dye having a delocalized positive charge.

4. The composition of claim 3 wherein Ar' is phenyl or naphthyl substituted with the substituents defined as in claim 3.

5. The composition of claim 4 wherein $Ar'SO_3^⊖$ is selected from 4-nitrotoluene-2-sulfonate, 2,4-dinitrobenzenesulfonate, naphthalene-2-sulfonate, dimethylisophthalate-5-sulfonate, o-chlorobenzenesulfonate, 3,4-dinitrobenzene sulfonate, 2,5-dinitrobenzenesulfonate, 2-nitrobenzenesulfonate, 3-ethoxy-carbonyl-4-cyanobenzenesulfonate, 3-trifluoromethyl-5-cyanobenzene sulfonate, 2,4-dibromobenzenesulfonate or 2,5-dichloro-benzenesulfonate.

6. The composition of claim 1 wherein the water-insoluble salt has the formula $K^⊕ ArSO_3^⊖$ wherein K⊕ and Ar are defined as in claim 1.

7. The composition of claim 6 wherein Z is an azo- or anthraquinone dye chromophore and Y is a covalent bond or alkylene of one to six carbon atoms.

8. The composition of claim 6 wherein Ar is phenyl or naphthyl substituted with the substituents defined as in claim 6.

9. The composition of claim 8 wherein $ArSO_3^⊖$ is selected from 3-nitrobenzenesulfonate, 4-nitrotoluene-2-sulfonate, 2,4-dinitrobenzenesulfonate, 3-methyltoluene-2-sulfonate, 2-nitro-4,5-dimethoxybenzenesulfonate, naphthalene-2-sulfonate, dimethylisophthalate-5-sulfonate, 2-chlorobenzenesulfonate, 2-fluorobenzenesulfonate, 4-cyanobenzene sulfonate, or 2,4-di-chlorobenzenesulfonate.

10. The aqueous dispersion of claim 1 wherein the water-insoluble salt has the formula

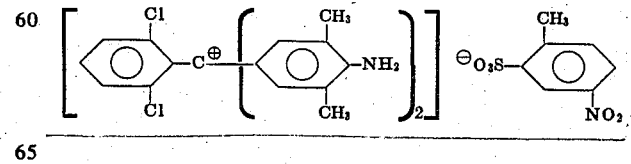

and the dispersing agent is the sodium salt of sulfonated lignin having 1 mole of sulfonation per lignin unit of 840 gms.

11. The aqueous dispersion of claim 1 wherein the water-insoluble salt has the formula

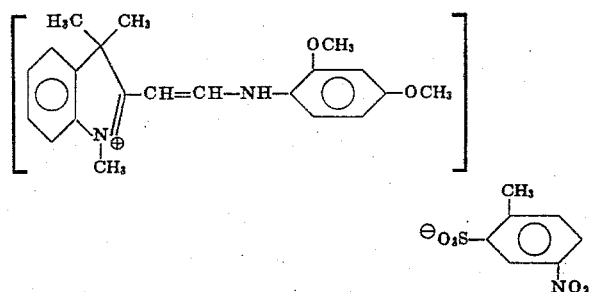

and the dispersing agent is the sodium salt of sulfonated lignin having 1 mole of sulfonation per lignin unit of 840 gms.

12. The aqueous dispersion of claim 1 wherein the water-insoluble salt has the formula

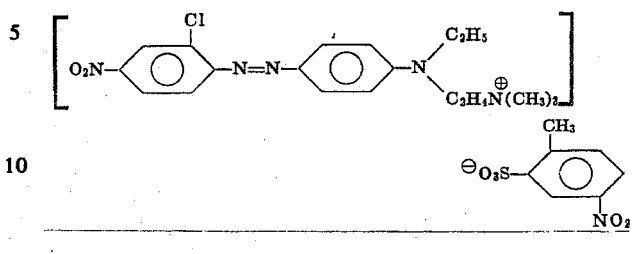

and the dispersing agent is the sodium salt of sulfonated lignin having 1 mole of sulfonation per lignin unit of 840 gms.

* * * * *